United States Patent
Blair et al.

(10) Patent No.: US 7,108,877 B2
(45) Date of Patent: Sep. 19, 2006

(54) BLACK TEA MANUFACTURE

(75) Inventors: Ruth Louisa Blair, Shambrook (GB); Michael Alan Cooper, Shambrook (GB); Clive Stanbra Harris, Shambrook (GB); Stephen Mwaniki Muasya, Kericho (KE); Andrew David Parry, Shambrook (GB)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 267 days.

(21) Appl. No.: 10/090,979

(22) Filed: Mar. 5, 2002

(65) Prior Publication Data

US 2003/0064130 A1  Apr. 3, 2003

(30) Foreign Application Priority Data

Mar. 5, 2001 (GB) ............................ 0105374.3
Oct. 26, 2001 (GB) ............................ 0125765.8

(51) Int. Cl.
*A23F 3/00* (2006.01)
(52) U.S. Cl. ........................................ 426/49; 426/597
(58) Field of Classification Search ................ 426/49, 426/597

See application file for complete search history.

(56) References Cited

U.S. PATENT DOCUMENTS 6,254,902 B1   7/2001   Hodges et al.
6,348,224 B1   2/2002   Patil et al.

FOREIGN PATENT DOCUMENTS

| GB | 2 243 675 A | 11/1991 |
|----|-------------|---------|
| RU | 466015 | 9/1975 |
| RU | 929041 | 5/1982 |
| RU | 1034686 | 8/1983 |
| RU | 1546049 A1 | 8/1987 |
| RU | 1517903 A1 | 10/1987 |
| RU | 1597148 A1 | 11/1988 |
| RU | 1678276 | 9/1991 |
| WO | 99/40799 | 8/1999 |
| WO | 01/11979 | 2/2001 |
| WO | 01/80713 | 11/2001 |
| WO | 01/82713 | 11/2001 |

OTHER PUBLICATIONS

GB Search Report on GB 0105374.3 dated Aug. 2001.
"*Tea Cultivation to Consumption*", Wilson et al., Chapman & Hill (1992), pp.483-485.

*Primary Examiner*—Anthony Weier
(74) *Attorney, Agent, or Firm*—Edward A. Squillante, Jr.

(57) ABSTRACT

A process for manufacturing a fast infusing black leaf tea. The process involves (a) withering tea leaves to a moisture content between 64 and 70%, (b) macerating the withered leaves tea leaves by the controlled application of both shear and compression forces sufficient to disrupt the majority of cells within the tea leaf, to introduce morphological changes in the tissue and to redistribute the cell contents, (c) fermentating the resulting dhool, (d) firing the leaves to arrest the fermentation and (e) drying and sorting the fired leaves to give black leaf tea. The black leaf tea shows a rate and degree of infusion typical of CTC teas, while maintaining the appearance of orthodox tea. The black leaf tea is preferably of Broken Orange Pekoe grade or larger if the black leaf tea is intended for direct infusion and of Broken Orange Pekoe and/or Broken orange Pekoe Fannings if the black tea is intended for use in tea bags 13 Claims, 15 Drawing Sheets Figure 10. Time course during fermentation of theaflavin levels from tea leaves subjected to a low pressure cut or a combination of a high pressure roll followed by the same low pressure cut.

Figure 11. Liquor colours of made teas derived from tea leaves subjected to a low pressure cut or a combination of a high pressure roll followed by the same low pressure roll

Figure 12
Figure 12. Light microscopy of tea leaves subjected to a low pressure cut (A) or a combination of a high pressure roll followed by the same low pressure cut. (B)
B
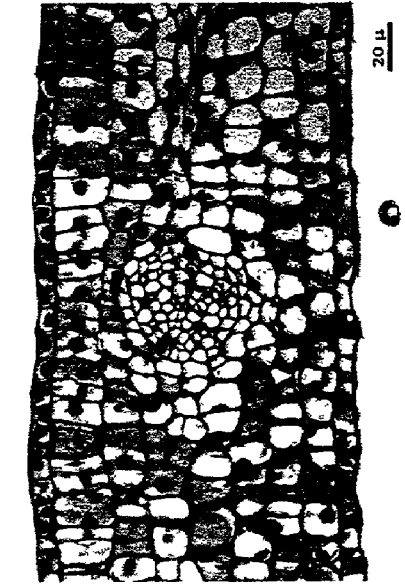
A

BLACK TEA MANUFACTURE

The present invention relates to tea processing, or more specifically, a process for manufacturing a high quality larger leaf black tea.

BACKGROUND AND PRIOR ART

Leaf tea may be prepared as green leaf tea or black leaf tea. Generally, to prepare black leaf tea fresh green leaves of the plant *Camellia sinensis* are withered (subjected to mild drying), comminuted, fermented (in which process enzymes in the tea leaf use atmospheric oxygen to oxidise various substrates to produce brown-coloured products) and then fired (to dry the tea leaves). Green leaf tea is not exposed to the fermentation process. Partial fermentation may be used to produce intermediate-type teas known as "oolong" tea.

Conventional wisdom dictates that in black tea manufacture tea must be macerated in some way to liberate the fermentative enzymes and their substrates within the leaves. One can macerate tea in many ways but broadly speaking there are two main mechanised methods for doing this.

The first, called "orthodox manufacture", involves rolling pre-weighed batches of heavily withered tea leaves prior to fermenting, firing and drying steps. So called "orthodox tea" is typically characterised by leaf particles that are aesthetically pleasing to many (resemble dried leaves rather than "granules" of CTC—see below) but produce lighter liquors due to less extensive fermentation and poorer infusion from the larger particles.

The second method is the most popular of a number of non-orthodox, continuous methods that involves using a machine resembling a mangle that cuts, tears and curls tea leaves. The original machine was invented by W. McKercher in 1930 and is commonly referred to as a CTC (cut-tear-curl) machine. The finely cut product is known generically as "CTC tea" and is characterised by a fast infusion rate and strong colour. This method tends to produce tea that is more consistent and uniform in quality and than the orthodox method but, as the CTC process tends to cause agglomeration of the tea material, it has the appearance of "granules" rather than leaf fragments.

Both orthodox and CTC rollers are often used in conjunction with a rotorvane machine, which is a type of extruder used to pre-condition (squeeze/shred) leaves prior to maceration. The rotorvane was invented as a form of continuous orthodox roller, but is rarely used as such today. Liquors generated from rotorvane teas are similar to orthodox in terms of liquor properties and infusion rates. These methods and their history and role in tea manufacture are described in "Tea: Cultivation to Consumption" edited by K. C. Willson and M. N. Clifford, Chapman & Hall, 1992.

Generally speaking consumer preference for either orthodox or CTC tea is a matter of national or regional culture. In many countries the visual appearance and texture of leaf tea are important indicators of quality, larger leaf particles being associated with higher quality. In Western markets tea is increasingly purchased in filter paper bags and the colour of the infused product tends to be more important.

Some consumers however want the best of both worlds; i.e. a leaf tea that looks and feels like orthodox processed tea but has the liquor characteristics of a fuller fermented CTC processed tea. The present applicants have developed methods for manufacturing black leaf teas that resemble orthodox processed tea but infuse like CTC processed tea.

Our international patent application WO 99/40799 discloses a method that involves subjecting whole tea leaves to a heat shock at a temperature and for a duration that is sufficient to initiate fermentation, and enabling the tea to ferment for a time and at a temperature that is sufficient to achieve desired liquor properties.

Our international patent application WO 00/10401 discloses a method for manufacturing fast infusing whole or large leaf teas by impregnating tea leaves with liquid carbon dioxide within a pressure vessel, depressurising the vessel at a rate that is sufficient to freeze the liquid carbon dioxide, applying sufficient heat to cause the frozen carbon dioxide to sublime and consequently initiate fermentation within the leaves, allowing the tea to ferment for a time that is sufficient to achieve desired liquor properties, and drying the fermented product to yield the whole leaf tea.

Our international patent application WO 01/11979 describes and claims a black leaf tea that has the appearance of orthodox processed black tea but is characterised in that it has the infusion characteristics of CTC processed black tea.

More recently our co-pending international patent application WO 01/82713 (claiming priority from United Kingdom patent application GB 0010315.0) discloses a method that involves withering a first supply of freshly plucked tea leaves, macerating the withered leaves, allowing the macerated withered leaves to ferment to produce fermented dhool, withering a second supply of freshly plucked tea leaves, mixing the fermented dhool obtained from the first supply of leaves with the withered leaves obtained from the second supply of leaves, rolling the mixture, allowing the rolled mixture to ferment, and drying the fermented mixture to yield black leaf tea.

Russian patent specification SU 1678276 discloses a method for processing tea leaves into tea granules and tea concentrates. Tea leaves are withered to a residual moisture content of about 64 to 65%, then rolled and graded. The smaller graded fraction is fermented and dried. The large fraction is cut and rolled then graded again. The small tea grades are processed further to make tea granules and the large grades are used to make tea concentrates. This is a modification of orthodox processing intended to increase the yield of high quality orthodox tea. The leaf products of this disclosure are traditional orthodox teas, i.e. slow infusing, high flavour, low colour teas.

Russian patent specification SU 1034686 discloses a method for manufacturing black leaf tea with good quality in a shorter than usual time. Tea leaves are withered to a residual moisture content of 70% moisture then rolled and graded. Larger leaves are reduced in size. The tea is mixed and simultaneously aerated with atmospheric air at 45 $m^3$/hour for 15 minutes after which it is dry. This gives orthodox leaf i.e. slow infusing, high flavour, low colour teas.

The present inventors, through a deeper understanding of the fermentation and infusion processes of tea, have developed an alternative method for making fast-infusing larger leaf black tea. This method can utilise adapted tea manufacturing equipment (such as the rotorvane and CTC) or novel processing equipment, but requires a thorough understanding and control of raw material (green leaf) properties, and the interaction with the processing equipment.

STATEMENT OF THE INVENTION

In broad terms the present invention relates to a process for manufacturing black tea comprising the steps of withering and macerating tea leaves, allowing them to ferment, firing the leaves to arrest fermentation and then drying and sorting the leaves to yield black leaf tea, the process being characterised in that the tea leaves are withered to a moisture content of between 64% and 70% (preferably between 64% and 68%) before being macerated by the controlled application of both shear and compression forces sufficient to disrupt the majority of cells within the tea leaf, to introduce morphological changes in the tissue (cell separation leading to air spaces more typically seen in mature leaves) and to redistribute the cell contents, all of which leads to fermentation and infusion typical of CTC teas, whilst maintaining the appearance of orthodox tea leaves. Preferably the leaf teas produced by the process of the present invention have an orthodox leaf grade of Broken Orange Pekoe (BOP) or larger.

Black leaf tea made in this way resembles orthodox processed leaf tea but infuses in freshly boiled water at a rate in excess of that of the equivalent mass of the same size grade tea that has undergone orthodox processing. The quality of the infusion is especially high.

In one example, using adapted commercial tea manufacturing equipment, freshly plucked tea leaves are withered to a target moisture content between 64 and 70% preferably 64 to 68%, passed through a rotorvane machine modified to deliver increased shear and compression. The rotorvane may be modified by replacing at least some of the vanes of the rotorvane with reverse facing vanes. Similar equipment which is capable of delivering the required shear and compression forces may be used instead of the modified rotorvane. The modified rotorvane step may be followed by a further cutting, dicing or chopping step to further tailor the size and shape of the particles. The further cutting step may take place by a single pass through a CTC machine modified so that its roller has fewer teeth per inch (tpi) than a conventional CTC machine. For example, the roller of the modified CTC machine preferably has 2 to 6 teeth per inch rather than the conventional 8 to 10 teeth per inch. This enables the modified CTC machine to reduce the size of very long leaves and stalk without producing the agglomerated finely cut leaf pieces that typify conventional CTC processed tea. As an alternative to the use of the modified CTC machine other dicing or chopping machines that give the required characteristics to the black tea may be used.

"Tea" for the purposes of the present invention means leaf material from *Camellia sinensis* var. *sinensis* or *Camellia sinensis* var. *assamica*. It also includes rooibos tea obtained from *Aspalathus linearis* however this is a poor source of endogenous fermenting enzymes. "Tea" is also intended to include the product of blending two or more of any of these teas.

"Leaf tea" means plant material obtained from a tea plant in an uninfused form.

"Black leaf tea" means substantially fermented leaf tea.

"Orthodox leaf size" means the leaf size of orthodox leaf tea that corresponds to the grades for orthodox leaf tea listed in Tables 1 and 2.

For the avoidance of doubt the word 'comprises' is intended to mean including but not necessarily "consisting of" or "composed of". In other words the listed steps or options need not be exhaustive.

BRIEF DESCRIPTION OF THE DRAWINGS

FIG. 12 shows the structure of tea leaves made by the process of the present invention when examined by a microscope. See Example

DETAILED DESCRIPTION OF THE INVENTION

The process of the present invention combines steps normally associated with CTC manufacture with those normally associated with orthodox manufacture and/or those normally associated with non-tea related food processing in a way that provides high quality fast-infusing large leaf tea within a desired grade profile.

Figure 1:
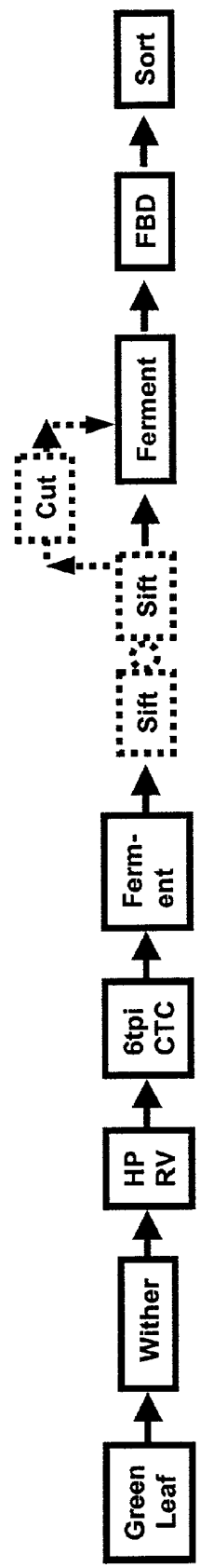
FIG. 1 is a diagrammatic representation of the process of the present invention.

A preferred scheme of the process of the present invention is shown in FIG. 1. The steps shown in boxes drawn from dotted lines represent an optional enhancement.

In the process a supply of freshly plucked tea leaves (so called green leaf) is withered prior to being macerated. The leaves can be withered in any conventional manner, for example by storing them for a period of time, usually perhaps up to 16 to 24 hours, during which time they undergo various biochemical and physical changes and typically lose moisture. The leaves must be withered to have a specific leaf moisture content between 64 and 70% preferably between 64 and 68%. This leaf moisture content is greater than that used in conventional orthodox tea manufacture (where final moisture content is usually less than 60%, often near 50%). It is however less than that used in conventional CTC tea manufacture, where the final moisture content has to be greater than 68%, usually 70–72%, otherwise too much heat is generated in the CTC machinery, especially at commercial throughputs. This controlled withering is important not only for flavour generation (as conventionally accepted) but also to ensure optimal CTC-like fermentation (where higher moisture content leads to improved oxidation of polyphenols), and to alter the physical properties of the leaf to optimise their interaction with the maceration equipment, and enable the necessary commercial throughputs.

The withered leaf is then subjected to a controlled shearing and compressing action by some suitable means that gives a leaf tea that has the appearance of orthodox leaf tea. The present inventors have found that subjecting the leaf to specific shearing and compressing forces during maceration results in effective internal disruption (both loss of integrity of the majority of individual cells within the tea leaf, and also the introduction of morphological changes in the tissue—cell separation leading to air spaces more typically seen in mature leaves) and to the redistribution of the cell contents, all of which leads to fermentation and infusion typical of CTC teas, whilst maintaining the appearance of orthodox tea leaves. The loss of integrity of the individual cells enables the mixing of the polyphenol substrates and the key oxidative enzyme polyphenol oxidase, a prerequisite for fermentation. Fermentation also requires oxygen, and the introduction of air spaces in the tissue helps overcome oxygen limitation observed in larger leaf pieces. In addition the present process allows this cell and tissue disruption to occur at a moisture content more optimal for fermentation than conventional orthodox manufacture. The introduced air spaces are preserved in the fired tea, which leads to more rapid hydration and infusion during the brewing process.

Operation of processing equipment to deliver the necessary shear and compression forces is dependent on the nature of the equipment, and its power supply. The important criteria are the effects on the tea leaves during maceration. This is judged by visual assessment of the dhool (juice being expressed on to the surface but not excessive loss of juice out of the dhool), analysis of the dhool (structure) and also of the made tea (infusion characteristics). For any specific piece of equipment operational parameters can be set once the above is achieved. For example a standard 15" rotorvane equipped with reverse-facing vanes as described in the current process is operated with a set throughput (e.g. 1500 kg/hr) and iris setting to generate a current of 35+/−5 amps. Similarly the gap setting of a 8.5" 6 tpi CTC is set to achieve a current of 28+/−3 amps.

The shearing and compressing action may be achieved using a modified rotorvane machine. A rotorvane machine comprises an outer cylindrical jacket housing a central conveying rotor fitted with opposed vanes with every successive pair of vanes set at right angles to its neighbour. The outer jacket has inwardly facing ribs against which the tea leaves are pressed as they pass through the machine. The discharge end of the rotorvane machine is fitted with an adjustable cone or iris which restricts the outlet providing control of the pressure within the machine. In a preferred modified rotorvane for use in the process of the present invention at least some of the vanes of the rotorvane are replaced with reverse facing vanes. Whilst not wishing to be bound by any theory, it is believed that the modified rotorvane gives rise to higher pressure on the material within the machine. Alternatively, similar equipment capable of delivering the required shearing and compression forces may be used instead of a modified rotorvane (e.g. various extruder and roller designs are possible). This step may be followed by a further cutting, dicing or chopping step to give tea of the required size and shape. Preferably a modified CTC machine in which the roller has fewer teeth per inch than conventional CTC machines is used. The roller of the modified CTC machine preferably has 2 to 6 teeth per inch rather than the conventional 8 to 10 teeth per inch. This enables the modified CTC machine to reduce the size of very long leaves and stalk without producing the finely cut leaf pieces that typify conventional CTC processed tea. In addition during conventional CTC manufacture these finely cut leaf particles are agglomerated as a result of the repeated cutting, leading to the granular appearance of fired CTC tea. Alternatively a dicing or chopping machine capable of delivering the required size and/or shape profile can be employed following the modified rotorvane The present inventors have found that dicing machines, particularly food dicing machines such as the J9-A model two dimensional belt-fed dicer with circular knives and the COMITROL™ food processors with rotary micro-cut heads that are commercially available from Urschel Laboratories Incorporated, Valparaiso, Ind., USA are particularly suitable for this purpose.

The macerated leaves are then left to ferment. The term "fermentation" is commonly used in the context of brewing alcohol to describe the action of exogenous enzymes. However in the tea world it is used to refer to the oxidative process that tea undergoes when certain endogenous enzymes and substrates are brought together following the disruption of the cells and tissues. During this process colourless catechins in the leaves are converted to a complex mixture of yellow and orange to dark-brown substances and a large number of aromatic volatile compounds are also produced. Fermentation is described in more detail in "TEA: Cultivation to Consumption" by Willson and Clifford (See pages 490 to 494 and Chapter 17). Fermentation may be carried out in a tub fermenter if desired.

The present inventors have found that the macerated leaf should be left to ferment for at least more than one hour, preferably more than two hours but preferably not more than 3 hours. The preferred fermentation time is about 120 to 140 minutes, more preferably around 125 minutes. Leaving the leaves to ferment for longer than three hours can detrimentally effect the quality of the final product. It can also have cost implications. These times are dependent on the ambient temperatures, but are comparable to conventional times for fermentation of CTC tea.

Fermentation is preferably conducted at ambient temperature, i.e. about 25° C., although 18° C. or even 15° C. can be suitable. If desired, fermentation can be accelerated at slightly higher temperatures such as 30° C. The use of an oxygen-enriched atmosphere in a fermentation vessel is also beneficial.

If desired, one can initiate fermentation in the withered leaves by subjecting the leaves to a heat shock at a temperature and for a duration that is sufficient to initiate fermentation as described in our international patent application WO 99/40799.

Alternatively, one can impregnate the withered tea leaves with liquid carbon dioxide within a pressure vessel, depressurise the vessel at a rate that is sufficient to freeze the liquid carbon dioxide, apply sufficient heat to cause the frozen carbon dioxide to sublime and consequently initiate fermentation within the leaves, allow the tea to ferment for a time that is sufficient to achieve desired liquor properties, and dry the fermented product to yield the whole leaf tea. Such a method is described in our international patent application WO 00/10401. A further alternative method of disrupting the leaves and initiating fermentation of rolled leaves is to subject the leaves to cycles of freezing and thawing.

If desired, the dhool can be treated with tannase (flavanol gallate esterase) to generate degallated catechins and gallic acid (which subsequently leads to the generation of high levels of theaflavins and non-gallated thearubigins during fermentation) or treated with tannase followed by hydrogen peroxide in a quantity that is sufficient for the endogenous peroxidases to oxidise gallic acid liberated by the tannase treatment. These treatments generate coloured species and enhance flavour. They are described in detail in our international patent application WO 00/47057, the disclosure of which is incorporated herein by reference.

If desired the grade profile can be further manipulated through the inclusion in the process of a dhool sifting step (see FIG. 1). Such an operation fractionates the macerated leaf particles on the basis of size, by passing the dhool over a vibrating mesh. The mesh size is selected according to the desired change required in the final grade profile. Material passing through the mesh proceeds directly to fermentation, whilst the material retained by the mesh is subjected to a further cutting operation. The latter can be achieved through using for example a rotorvane, a CTC or a cutting\dicing machine such as those manufactured by Urschel. Once cut this material is also fermented. The sifting step can occur immediately post the primary maceration, or preferably after a short fermentation (15–30 minutes) which reduces the "stickiness" of the dhool particles.

As a final step, the fermented mixture is fired, dried and sorted to yield a black leaf tea that resembles orthodox processed leaf tea but infuses in freshly boiled water at a rate in excess of that of the equivalent mass of the same tea that has undergone orthodox processing.

The firing involves heating and drying the tea to destroy the fermenting enzymes and thereby arrest fermentation. It results in a reduction of moisture content to below 5%, preferably 2.5–3%, and also leads to further chemical/biochemical oxidation and changes in tea aroma. This generally involves exposing the tea to a blast of hot, dry air in a dryer, for example a fluid bed dryer.

The dried leaf tea may be sorted into its various grades using any sorting and grading means known to those skilled in the art. Suitable sorting means are described in "Tea: Cultivation to Consumption" edited by K. C. Willson and M. N. Clifford, Chapman & Hall, 1992, pages 500 to 502. Prior to sorting, oversize material which will not pass through, for example, a Boulton Mesh 8 (aperture size 2.6 mm) screen may be removed and then fibrous material may be removed by passing the tea near or through electrostatically charged rollers. The leaf tea may then be passed through a series of vibrating screens where the various grades are retained and collected. In the Examples hereinafter the screens described in Table 1 are used to separate the black leaf tea into five size ranges.

TABLE 1

| Size Range | MESH NUMBERS | APERTURE OF MESHES |
|---|---|---|
| LL Large leaf | 12–8 | 1.5–2.6 mm |
| ML Medium Leaf | 20–12 | 1.0–1.5 mm |
| SL Small leaf | 32–20 | 0.5–1.0 mm |
| FL Fine leaf | 40–32 | 0.4–0.5 mm |
| D Dust | below 40 | below 0.4 mm |

The large leaf (LL) and medium leaf (MM) black leaf teas are particularly preferred when the black tea is intended to be infused directly in water though these teas may also be used in tea bags if required. Therefore the process of the present invention should be operated in such a way as to maximise the yield of larger size ranges if the black leaf tea is to be directly infused. However, if the black leaf tea produced by the process of the present invention is intended to be used in tea bags then it is preferable to operate the process of the present invention in a way that maximises the amount of the smaller size ranges, for example the medium leaf (ML) and/or small leaf (SL) black teas in the final product. By modifying the process of the present invention as is described hereinafter the distribution of size ranges within the black leaf tea product can be tailored to the size ranges required.

The grade of leaf tea is commonly measured in the tea trade as it is a critical factor in assessing the consumer acceptance and quality of tea. As explained in "Tea: Cultivation to Consumption" edited by K. C. Willson and M. N. Clifford, Chapman & Hall, 1992, pages 502, there is no universal standard though the International Standardization Organisation has issued an international standard (ISO 6078–1982) which gives some guidance on the subject. Some common grades of leaf are listed in Table 14.2 on page 501 of the above Willson and Clifford reference and are reproduced in Table 2. This is not however a comprehensive list of the grades given to orthodox leaf teas.

TABLE 2

Tea grades in descending order of particle size

| Grades | Abbreviation | Source |
|---|---|---|
| Whole leaf grades | GFOP | Orthodox manufacture only |
|  | FOP |  |
|  | OP |  |
| Brokens | FBOP | Major products from rotorvane manufacture only |
|  | BOP |  |
|  | BP |  |
| Fannings | BOPF | Major products from CTC manufacture |
|  | OF |  |
|  | PF |  |
| Dusts | PD |  |
|  | RD |  |

The product of the process of the present invention is preferably sorted to give orthodox-looking leaf tea of broken orange pekoe (BOP) grade tea or larger if the black tea is intended to be directly infused in boiling water to make a tea beverage. Smaller grades may be preferred if the black leaf tea is to be used in tea bags.

The large leaf (LL) black leaf tea of Table 1 would be classed as Pekoe in the grading given in Table 2, medium leaf (ML) would be classed as Broken Orange Pekoe, small leaf (SL) would be classed as Broken Orange Pekoe Fannings and fine leaf (FL) would be classed as Pekoe Dust.

A more detailed classification system for orthodox grades of leaf tea used by the present applicants is given in Table 3. Many of these grades are identified in the Annex to International Standard ISO 6078-1982 published by the International Organisation for Standardization. Where this is the case, the ISO abbreviation is given in the final column of Table 3.

TABLE 3

Orthodox Leaf size classification

| ORTH leaf size | Name of grade | ISO Abbreviation |
| --- | --- | --- |
| O | Churamoni Dust | CD |
|   | Dust Three |   |
| P | Dust | D |
| Q | Pekoe Dust | PD |
|   | Secondary Fannings |   |
| R | Broken Orange Pekoe Fannings | BOPF |
|   | Pekoe Fannings | PF |
| S | Fannings |   |
|   | Fannings Two |   |
| T | Broken Orange Pekoe | BOP |
|   | Leafy Broken Orange Pekoe Fannings |   |
|   | Broken Tea | BT |
| U | Leafy Broken Orange Pekoe |   |
|   | Small Pekoe |   |
|   | Flowery Broken Orange Pekoe | FBOP |
| V | Pekoe | P |
| W | Large Pekoe |   |
|   | Broken Pekoe Souchong | BPS |
| X | Orange Pekoe | OP |
| V | Broken Pekoe | BP |
|   | Broken Pekoe Two | BP2 |
| Y | Broken Tea Two | BT2 |
|   | Broken Mixed | BM |

The black leaf tea produced by the process of the present invention is orthodox in shape preferably with leaf size of grade T or higher (preferably Grade V or higher) as set out in Table 3 if the black leaf tea is intended to be infused directly in boiling water to make a tea beverage. Smaller grades may be preferred if the black leaf tea is to be used in tea bags. As will be seen hereinafter in Example 2 an expert tea taster assessed the medium leaf (ML) blacks teas produced as in Example 1 as grade T and the large leaf (LL) black teas as grade V. Small leaf (SL) black leaf tea as described in Table 1 would be classed as grade R and fine leaf (FL) black leaf tea as described in Table 1 would be classed as grade P/Q.

The present inventors, and expert tea tasters, were very surprised at the quality of the product produced by the process of the invention. Not only does it have the appearance of orthodox leaf, and the fast infusion and red liquors associated with CTC teas, but it also has a very high overall quality and flavour. The process thus effectively delivers the most useful attributes from both CTC and orthodox teas, in one product.

The process of the present invention involves less process complexity than the method described in co-pending international patent application WO 01/82713 (claiming priority from United Kingdom patent application GB 0010315.0) and gives a product with greater flavour (and therefore higher quality as judged by international tea tasters). There is also more flexibility to alter leaf shape and/or size.

Orthodox Appearance

An expert tea taster can clearly distinguish teas that have the appearance of orthodox and teas that have the appearance of CTC processed tea. In layman's terms, orthodox tea tends to be flattened, rolled and twisted and CTC processed tea is more granular in appearance. While tea tasting (which includes grading) can appear to be more of an art than a science, the skilful precision with which experienced tea tasters can judge and categorise teas should not be underestimated.

In Example 2 an expert tea taster assessed black leaf tea made by the process of the present invention as being orthodox tea.

Orthodox Appearance as Determined by Particle Shape

The flattening, rolling and twisting operations that typify orthodox black tea manufacture tend to produce slivers of leaf fragments whereas the more disruptive chopping action of CTC machines produces granular tea fragments that are more uniform in size and shape. One can therefore characterise teas that have an orthodox appearance as having an average length that is preferably at least twice the average width of the tea (i.e. an aspect ratio of 2:1), more preferably at least three times the average width of the tea (i.e. aspect ratio 3:1).

In an extension to this, as an attempt to define orthodox appearance the applicant has devised a method for effectively measuring the roundness of tea fragments, or rather their deviation from perfect roundness (see Examples 3 and 4). The method involves making images of tea fragments and measuring the D-circle perimeter ratio (DCPR). The DCPR is defined by the expression:

$$DCPR = \frac{P}{2 \cdot \sqrt{(A \cdot \pi)}}$$

wherein P is the observed perimeter of a particle and A is its observed area. It is in effect the ratio between the actual perimeter of an object and the perimeter of its D-circle—i.e. a hypothetical circle that has the same area as the object. This parameter has a minimum value of DCPR=1 (for a circle). All other shapes have DCPR values greater than one. It is independent of size.

The aspect ratio versus DCPR based on perfect rectangles can be compared as follows: 1:1 (1.128), 2:1 (1.197), 3:1 (1.303), 4:1 (1.410), 5:1 (1.514), 6:1 (1.612), 7:1 (1.706), 8:1 (1.795), 9:1 (1.881) and 10:1 (1.962). Of course in practice the irregular edges of real tea particles would increase the DCPR slightly.

A black leaf tea of the present invention is one where preferably at least about 5% of the tea particles have a D-circle perimeter ratio of 1.6 or greater, more preferably at least about 10% of the tea particles have a D-circle perimeter ratio of 1.6 or greater, and even more preferably at least about 15% of the tea particles have a D-circle perimeter ratio of 1.6 or greater. This corresponds to an aspect ratio, for the relevant percentages, approaching 6:1.

Modification of Appearance by Cutting After Rotorvane

Quartile analysis (see Example 4) reveals that exposing the leaves to higher pressure during maceration (as in the modified rotorvane but without a subsequent cutting step) can lead to a higher percentage of larger leaf particles, particularly in the large size fractions. Whilst this may be advantageous in some instances production of more uniform particles is necessary for many uses, particularly packing in to tea bags. Treating the leaf with a cutting step (such as the 6 tpi CTC) after maceration in for example the modified rotorvane can modify the appearance in a positive manner if the black leaf tea is intended to be used in tea bags. The product still resembles orthodox leaf, but is now more uniform in shape (i.e. "squarer") and may be used to fill tea bags.

CTC Infusion Character as Determined by Infusion Performance

Black leaf tea made by the process of the present invention resembles orthodox processed black tea, at least on a macroscopic level, but it does not exhibit the infusion characteristics of orthodox processed tea. The product of the process of the present invention exhibits infusion characteristics normally only in seen in CTC processed teas. These characteristics include the rate and extent of infusion as evidenced by the amount of colour generated within a fixed time.

Infusion performance is determined in part by leaf particle size. Small leaves or leaf portions have a larger surface to volume ratio than large leaves or leaf portions and thus will tend to infuse faster than large leaves. The applicant has shown in Example 5 that when using comparable leaf sizes infusions of orthodox teas tend to be less red and more yellow than infusions of CTC teas and teas made by the process of the present invention infuse more like a CTC leaf tea than an orthodox leaf tea.

Ideally the black leaf tea of the present invention preferably infuses at a rate that is at least as fast as the equivalent mass of the same tea or one of a comparable size that has undergone CTC processing. The black leaf tea can be blended with traditionally processed black tea or tea granules in order to meet predetermined liquor characteristics.

The infusion kinetics of the tea of the present invention have been compared to those of co-pending international patent application WO 01/82713 (claiming priority from United Kingdom patent application GB 0010315.0), and it can be clearly seen that for the two grades shown (large and medium leaf), the present leaf infuses faster and delivers a darker liquor. The co-pending application describes a process manufacturing orthodox leaf with CTC infusion, that involves co-rolling freshly withered leaf and fermented CTC dhool. The present invention delivers a product with similar or improved infusion characteristics from a logistically less complex process (i.e. not requiring separate process lines for CTC dhool and leaf).

CTC Infusion Character as Determined by Liquor Quality

CTC infusion character can be determined by an expert tea taster, both in the presence or absence of milk, both qualitatively and quantitatively on a suitable industry scale. Expert tea tasters can rate liquor quality (i.e. measuring taste attributes including flavour volatiles), colour, brightness and thickness using a scale such as that described in Examples 6 and 7.

The black leaf teas of the present invention infused in the absence of milk (as is common in Continental Europe and USA) or with milk added (as is common in the United Kingdom) provide a liquor quality that resembles that of CTC manufactured teas rather than orthodox manufactured teas. The distinction was found to be more sharp when assessing the milked infusions. In fact the milked infusions of the black leaf teas of the present invention have been found to be as well coloured as the more colourful CTC infusions.

One might even define the black teas of the present invention as those which when infused in tap water (Crawley, United Kingdom) for 2 minutes and 15 seconds at a concentration of 13.3 g/l then milked by adding 10 ml milk per 235 ml infusion the liquor quality is between from 4 to 6, but preferably between from 5 to 6.

The sensory properties of the tea of the present invention have been compared to those of co-pending international patent application WO 01/82713 (claiming priority from United Kingdom patent application GB 0010315.0), through Sensory Analysis (QDA). This reveals significant differences in the aromas of the two products, with higher aroma scores given for the tea of the current invention (contributing to the high quality as judged by the expert tea tasters).

The black leaf tea that is manufactured by the process of the present invention can be blended with traditionally processed black tea or tea granules in order to meet predetermined liquor characteristics.

The process of the invention will now be described with reference to the following illustrative examples.

EXAMPLE 1

Manufacture of Black Tea

The process of the current invention was operated at factory scale by Brooke Bond Kenya. Standard quality green leaf was withered for 16 hours to a final moisture content of 68+/−1%. The withered leaf was passed through a Vikram 15" rotorvane fitted with 3 reverse facing vanes, at a throughput of 1500 kg/hour. The configuration of the rotorvane was adjusted to maintain a current of 35+/−5 amps (to deliver the necessary pressure). The dhool from the rotorvane was fed directly into an 8.5" CTC machine fitted with 6 teeth per inch rollers. The gap width between the rollers was adjusted to maintain a current of 28+/−3 amps. The dhool from the CTC machine was loaded into GWA fermentation tubs, which were connected to a humidified air supply. The flow of air through the dhool was adjusted to maintain a fermentation temperature of 22+/−2° C., for a period of 125+/−10 minutes. The tea was fired in a fluid bed dryer, maintaining an air outlet temperature of 180+/−5° C., to a final moisture content of 2.5–3.0%. The material from the drier was passed over a Boulton Mesh 8 (2.6 mm aperture size) screen to remove oversize material. Fibrous material was removed by electrostatically charged rollers. The leaf tea was then graded using Boulton screens. The mesh sizes on the Boulton sortation equipment were selected according to the particle size ranges required and the grades set out in Table 1 above were separated and collected.

Assessment of the product from this process is described in Examples 2 to 8.

EXAMPLE 2

Differentiating Between the Appearance of Orthodox and CTC Teas Using an Expert Tea Taster The inventors asked an expert tea taster to select 17 teas from around the world, some orthodox and some CTC. They then asked the expert to classify those teas as well as two samples of each of two grades of black leaf teas that were made by the method of Example 1 (one medium leaf (ML), the other large leaf (LL)).

The taster gives a three letter code to each sample. The first letter of the three-letter code denotes whether the leaf tea has the appearance of leaf tea made by orthodox manufacture (O), CTC manufacture (C), or a mixture (M). The second letter denotes the leaf size in accordance with grades as described in Table 3 above. The third letter denotes the leaf style in accordance with the rating system given in Table 4 below:

TABLE 4

Leaf style classification

| Style | Leaf description |
|---|---|
| 1 | Powdery |
| 2 | Very stalky/fibrous |
| 3 | stalky/fibrous |
| 4 | Mixed/few fibres |
| 5 | Rather mixed |
| 6 | Fair |
| 7 | Good |
| 8 | Very good |
| 9 | Speciality/excellent style |

The assessment was made on the basis of a number of factors including leaf size, twist, surface area and colour. The three letter code assigned to each sample by the taster is shown in Table 5. In each case the tea taster classified the black teas of the present invention as having an orthodox appearance.

TABLE 5

Comparison of known and novel teas by an expert tea taster

| Code | Type | Origin | Grade | Leaf |
|---|---|---|---|---|
| ODX1 | Orthodox | Indonesia | BOPF | OT5 |
| ODX2 | Orthodox | China | BOP | OT3 |
| ODX3 | Orthodox | Assam | FBOP | OU5 |
| ODX4 | Orthodox | Ceylon | EBOP | OU8 |
| ODX5 | Orthodox | Ceylon | BOP | OT5 |
| ODX6 | Orthodox | Indonesia | BOP | OT6 |
| ODX7 | Orthodox | Ceylon | BOP | OT5 |
| CTC1 | CTC | Siongo | BP1 | CH6 |
| CTC2 | CTC | Ecuador | BP1 | CH3 |
| CTC3 | CTC | Kavuzi | BP1 | CH4 |
| CTC4 | CTC | Indonesia | BP1 | CH3 |
| CTC5 | CTC | Vietnam | BOP | CI3 |
| CTC6 | CTC | Malawi | BP1 | CI4 |
| CTC7 | CTC | Kenya Rukuriri | BP1 | CH7 |
| CTC8 | CTC | Kenya Bondet | BP1 | CH4 |
| CTC9 | CTC | Ceylon | BP1 | CH4 |
| CTC10 | CTC | Assam | BP | CH5 |
| ML Sample 1 | Example 1 | Kenya, Kericho | ML | OT5 |
| ML Sample 2 | Example 1 | Kenya, Kericho | ML | OT5 |
| LL Sample 1 | Example 1 | Kenya, Kericho | LL | OV5 |
| LL Sample 2 | Example 1 | Kenya, Kericho | LL | OV5 |

EXAMPLE 3

D-circle Perimeter Ratio Analysis

As mentioned above, the flattening, rolling and twisting operations that typify orthodox black tea manufacture tend to produce slivers of leaf fragments tea whereas the more disruptive chopping action of CTC machines and the tendency of the CTC process to cause agglomeration produces granular tea fragments. The applicant has devised a method for effectively measuring the roundness of tea fragments, or rather their deviation from perfect roundness.

The method involves making images of tea fragments and measuring the D-circle perimeter ratio (DCPR). The DCPR is defined by the expression:

$$DCPR = \frac{P}{2 \cdot \sqrt{(A \cdot \pi)}}$$

wherein P is the observed perimeter of a particle and A is its observed area. It is in effect the ratio between the actual perimeter of an object and the perimeter of its D-circle—i.e. a hypothetical circle that has the same area as the object.

This parameter has a minimum value of DCPR=1 (for a circle). All other shapes have DCPR values greater than one. It is independent of size.

Samples of some of the teas from around the world used in Example 2 were taken and compared with samples of medium leafed (ML) teas and large leafed teas (LL) prepared by the process of Example 1. In each case small samples were taken randomly with a spatula.

Only the outline shape of the particles (i.e. silhouettes) of the particles needed to be imaged, not the surface detail. It was also important that shadows be avoided. The leaf samples were therefore spread out on a sheet of glass and back-illuminated on a WILD M8™ low power microscope. A magnification was chosen which allowed as many particles as possible per field, but at the same time allowed each particle to be sufficiently large for meaningful measurements to be taken. The magnification chosen gave a field size of 21×15.75 mm.

Images were grabbed using a JVC KY 55™ camera and a NOETECH™ frame grabber. The pixel resolution was 768×576. Some background was left visible in each micrograph in order to ensure that the particles had not been eroded by over-lighting. Twelve or fifteen fields were taken for each sample, giving a total particle count of typically 300–400. All images were permanently archived.

An image analyser (KONTRON KS 300™) was used to measure binary images (i.e. where all pixels are either black or white). The areas to be measured are rendered white, the background is black. 'Segmentation' is the process by which the binary image is generated from the original.

The original image was rendered monochrome. A threshold level was selected below which everything was rendered black (pixel value=0) and above which everything was rendered white (i.e. pixel value=255). The threshold level varied slightly from image to image, and was chosen to avoid either dilating or eroding the outline of the particles; it was generally around 140. This produced an image in which the particles were black and the background white.

The image was reversed (i.e. to produce white particles on a black background) and any particles in contact with the edge of the image (and therefore partly obscured) were deleted. The end result at this stage was a binary segmentation mask. These were also archived.

Prior to measurement, each image was put through an 'opening' procedure that alternately eroded and dilated particles three times. This had the effect of smoothing the surfaces slightly and removing small surface decorations which do not contribute to the overall shape or size of the object, but which can inflate an estimate of its perimeter. This part of the procedure was performed in the aforementioned KONTRON KS 300™ imager analyser.

Particles were then measured and the data aggregated from all the images in each sample set. The results obtained are given in Table 6 below.

TABLE 6

Comparison of known and novel teas by measuring frequency of particles having certain D-circle perimeter ratios

| SAMPLE | % DCPR <1.2 | % DCPR 1.2–1.39 | % DCPR 1.4–1.59 | % DCPR ≧1.6 |
|---|---|---|---|---|
| ctc1 | 12.5 | 68.0 | 16.7 | 2.9 |
| ctc3 | 25.0 | 61.9 | 9.5 | 3.7 |
| ctc6 | 20.3 | 65.6 | 9.7 | 4.4 |
| ctc8 | 12.4 | 66.0 | 19.5 | 2.1 |
| ctc10 | 19.7 | 66.3 | 12.2 | 1.8 |
| odx1 | 8.1 | 53.4 | 24.3 | 14.3 |
| odx2 | 21.5 | 56.2 | 13.6 | 8.7 |
| odx3 | 4.3 | 34.2 | 36.2 | 25.3 |
| odx4 | 3.2 | 33.7 | 33.0 | 30.2 |
| odx5 | 12.6 | 48.8 | 28.0 | 10.6 |
| odx7 | 11.4 | 40.5 | 29.6 | 18.5 |
| odx7 | 11.4 | 40.5 | 29.6 | 18.5 |
| Example 1 ML | 4.3 | 41.3 | 32.5 | 21.9 |
| Example 1 LL | 4.2 | 34.8 | 37.0 | 24.0 |

CTC teas show a much higher proportion of particles in the <1.2 DCPR class (10–25%) than in the ≧1.6 class (3–4%); i.e. they consisted in the main of low aspect ratio material. The orthodox 10 teas were more variable. ODX2 was much like a CTC in character, whereas ODX3 & ODX4 showed only 3–4% in the <1.20 DCPR class but 25% & 30% in the ≧1.6 class. But in general known orthodox manufactured teas contain significantly more particles having a DCPR greater or equal to 1.6 than known CTC manufactured teas.

The black leaf teas prepared by the method of the present invention were shown to have a higher percentage of particles, particularly in the larger size fractions, having a DCPR greater or equal to 1.6 thus confirming their orthodox appearance.

EXAMPLE 4

Modification of Appearance by Cutting After Rotorvane

Figure 2:
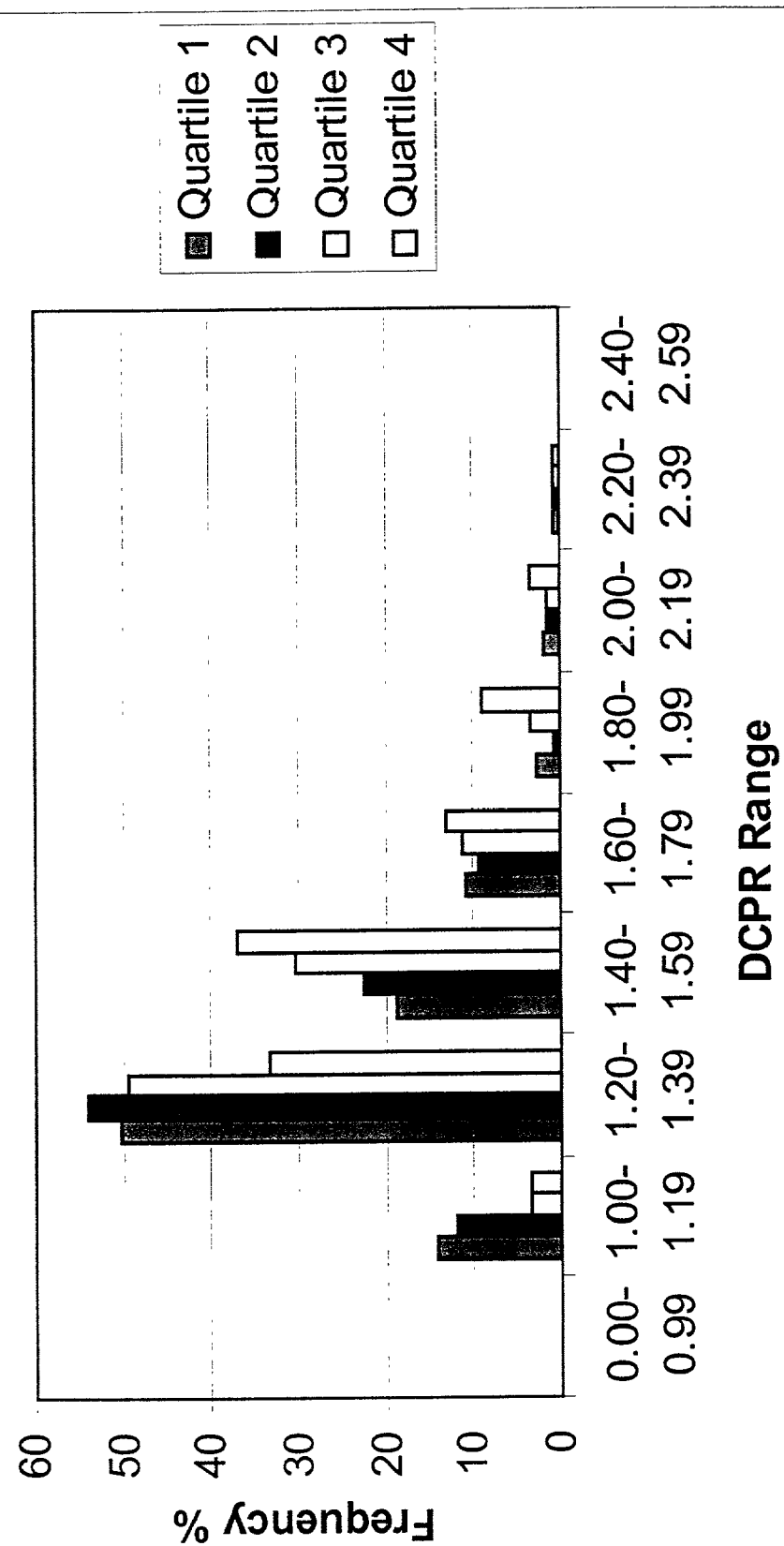
FIG. 2 is a DCPR frequency histogram of large leaf black manufactured by the process described in co-pending international patent application WO 01/82713 (claiming priority from United Kingdom patent application GB 0010315.0). See Example 4.
Figure 3:
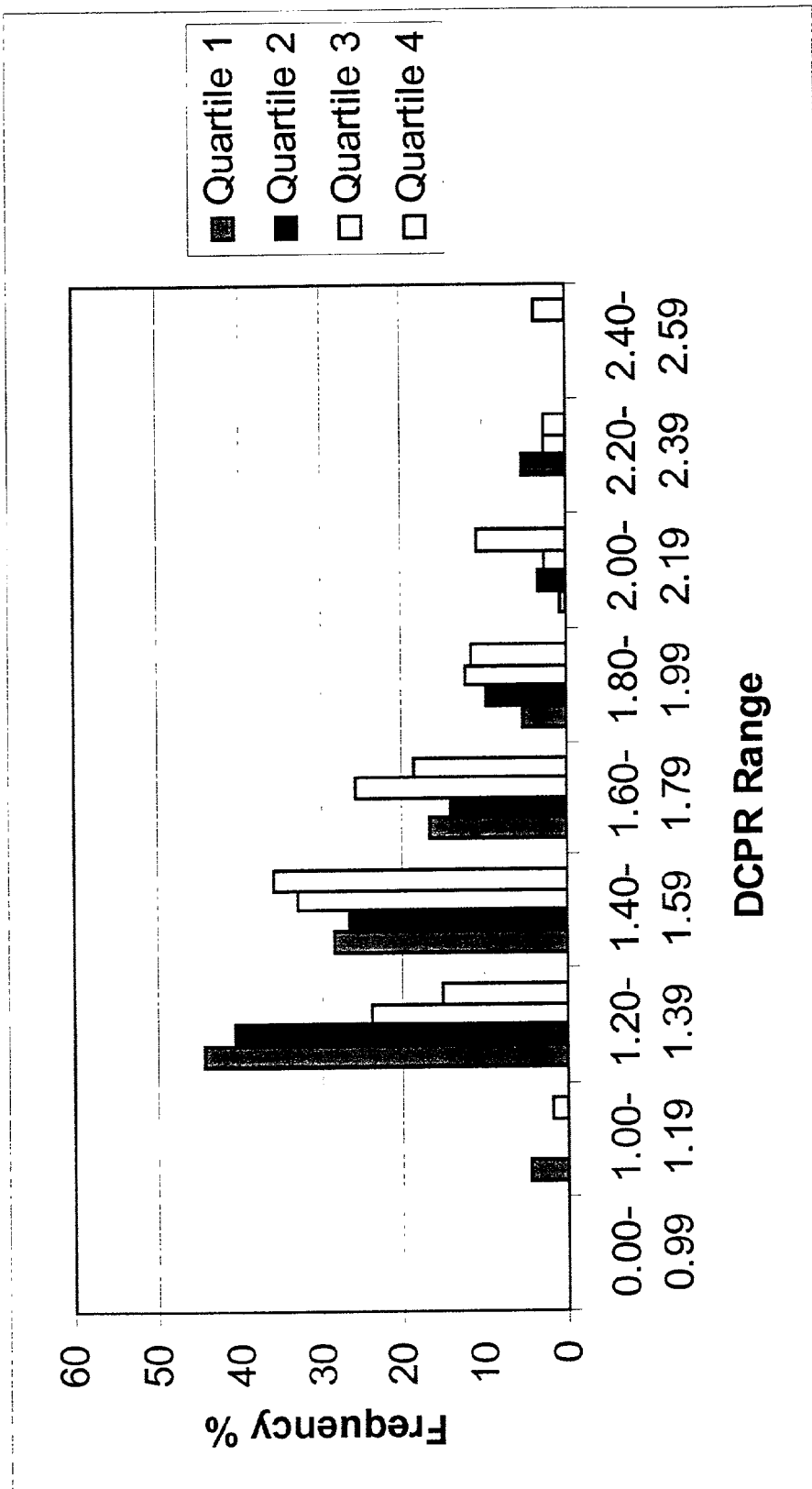
FIG. 3 is a DCPR frequency histogram of large leaf black manufactured by the process of the present invention using a modified rotorvane without a subsequent 6 tpi CTC cut. See Ex. 4.
Figure 4:
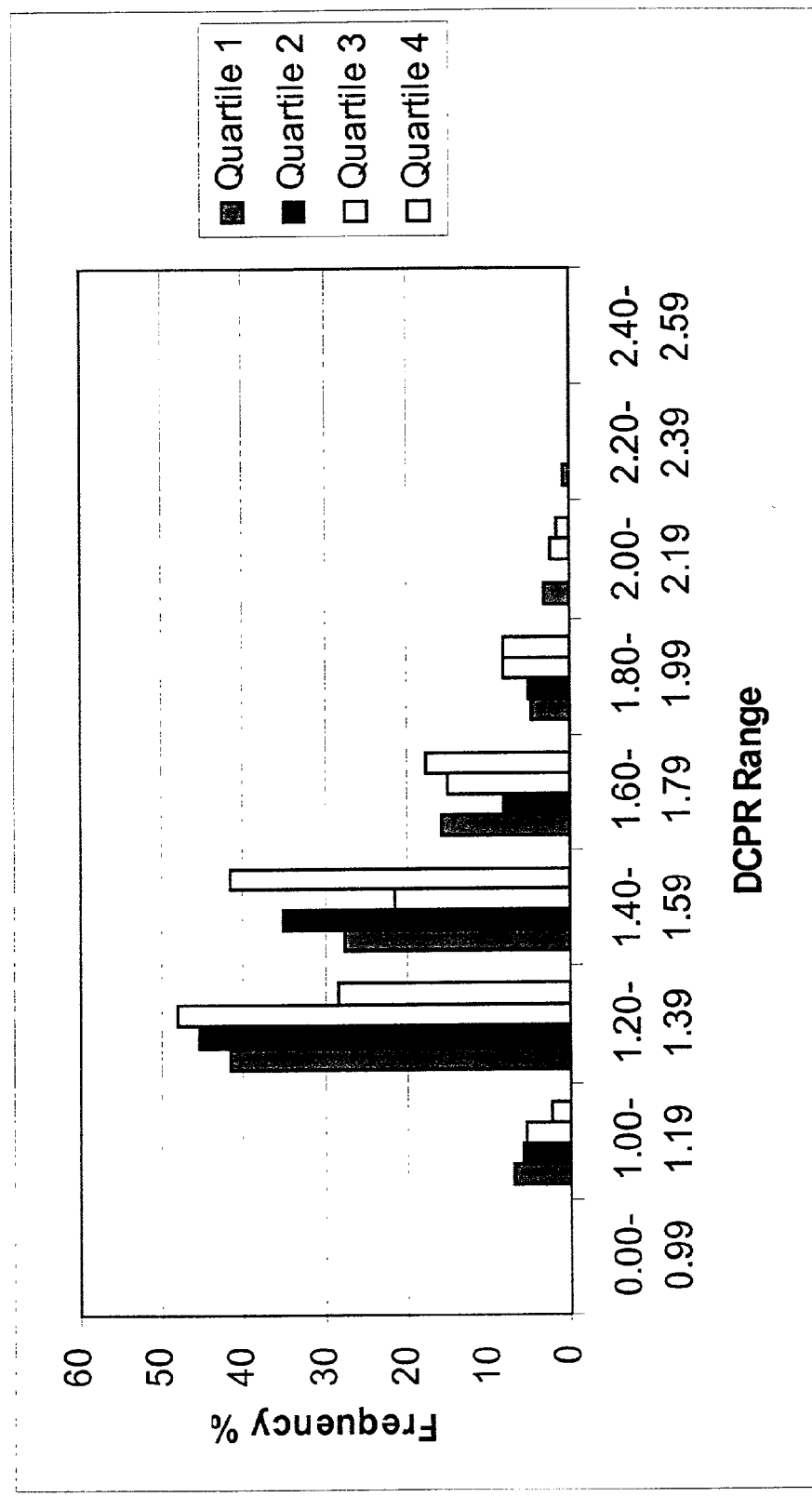
FIG. 4 is a DCPR frequency histogram of large leaf black manufactured by the process of the present invention using a modified rotorvane with a subsequent 6 tpi CTC cut. See Ex. 4.

DCPR analysis was also performed on large leaf teas manufactured (a) using the process described co-pending international patent application WO 01/82713 (claiming priority from United Kingdom patent application GB 0010315.0) (see Table 7 and FIG. 2), (b) using the modified rotorvane as described in Example 1 but without the subsequent 6 tpi CTC cut (see Table 8 and FIG. 3) and (c) using the modified rotorvane as described above with a subsequent 6 tpi CTC cut as described in Example 1 (see Table 9 and FIG. 4). The results are represented as frequency histograms in FIGS. 2, 3 and 4.

TABLE 7

Quartile analysis of large leaf tea made by the process described in GB 0010315.0

| | Frequency % | | | | | | | | |
|---|---|---|---|---|---|---|---|---|---|
| DCPR | 0.00–0.99 | 1.00–1.19 | 1.20–1.39 | 1.40–1.59 | 1.60–1.79 | 1.80–1.99 | 2.00–2.19 | 2.20–2.39 | 2.40–2.59 |
| Quartile 1 | 0 | 14.09 | 50.34 | 18.79 | 10.74 | 2.68 | 2.01 | 0.67 | 0 |
| Quartile 2 | 0 | 11.84 | 53.95 | 22.37 | 9.21 | 0.66 | 1.32 | 0.66 | 0 |

TABLE 7-continued

Quartile analysis of large leaf tea made by the process described in GB 0010315.0

| | Frequency % | | | | | | | | |
|---|---|---|---|---|---|---|---|---|---|
| DCPR | 0.00–0.99 | 1.00–1.19 | 1.20–1.39 | 1.40–1.59 | 1.60–1.79 | 1.80–1.99 | 2.00–2.19 | 2.20–2.39 | 2.40–2.59 |
| Quartile 3 | 0 | 3.31 | 49.67 | 30.46 | 11.26 | 3.31 | 1.32 | 0.66 | 0 |
| Quartile 4 | 0 | 3.27 | 33.33 | 37.25 | 13.07 | 9.15 | 3.27 | 0.65 | 0 |

TABLE 8

Quartile analysis of large leaf tea made by the process of the present invention without a subsequent 6 tpi CTC cut

| | Frequency % | | | | | | | | |
|---|---|---|---|---|---|---|---|---|---|
| DCPR | 0.00–0.99 | 1.00–1.19 | 1.20–1.39 | 1.40–1.59 | 1.60–1.79 | 1.80–1.99 | 2.00–2.19 | 2.20–2.39 | 2.40–2.59 |
| Quartile 1 | 0 | 4.42 | 44.25 | 28.32 | 16.81 | 5.31 | 0.88 | 0 | 0 |
| Quartile 2 | 0 | 0 | 40.71 | 26.55 | 14.16 | 9.73 | 3.54 | 5.31 | 0 |
| Quartile 3 | 0 | 0 | 23.89 | 32.74 | 25.66 | 12.39 | 2.65 | 2.65 | 0 |
| Quartile 4 | 0 | 1.79 | 15.18 | 35.71 | 18.75 | 11.61 | 10.71 | 2.68 | 3.57 |

TABLE 9

Quartile analysis of large leaf tea made by the process of the present invention with a subsequent 6 tpi CTC cut

| | Frequency % | | | | | | | | |
|---|---|---|---|---|---|---|---|---|---|
| DCPR | 0.00–0.99 | 1.00–1.19 | 1.20–1.39 | 1.40–1.59 | 1.60–1.79 | 1.80–1.99 | 2.00–2.19 | 2.20–2.39 | 2.40–2.59 |
| Quartile 1 | 0 | 6.72 | 41.79 | 27.61 | 15.67 | 4.48 | 2.99 | 0.75 | 0 |
| Quartile 2 | 0 | 5.88 | 45.59 | 35.29 | 8.09 | 5.15 | 0 | 0 | 0 |
| Quartile 3 | 0 | 5.19 | 48.15 | 21.48 | 14.81 | 8.15 | 2.22 | 0 | 0 |
| Quartile 4 | 0 | 2.19 | 28.47 | 41.61 | 17.52 | 8.03 | 1.46 | 0 | 0 |

It was concluded from these results that exposing the leaves to higher pressure during maceration (as in the modified rotorvane) can lead to a higher percentage of larger leaf particles, particularly in the large size fractions.

Treating the leaf with a cutting step (such as the 6 tpi CTC) post-rotorvane can modify the appearance such that while the product still resembles orthodox leaf it is more uniform in shape (i.e. "squarer") making the resulting black leaf tea suitable for use in tea bags.

EXAMPLE 5

Differentiating Between Orthodox and CTC Teas by Infusion Performance

Orthodox manufactured teas generally infuse more slowly than CTC manufactured teas. This reflects the degree of maceration. One would therefore expect a black leaf tea that resembles orthodox tea to infuse like an orthodox tea.

The inventors selected 13 of the teas from around the world used in Example 2 and compared the infusion performance of those teas against two samples of medium leaf teas made by the process described in our co-pending international patent application WO 01/82713 (claiming priority from United Kingdom patent application GB 0010315.0) (designated 143 ML and 147 ML in Table 10) and two samples of medium leaf teas (ML grade) manufactured by the process of Example 1 (designated 269 ML and 270 ML in Table 10). The teas were selected purely on the basis of comparable leaf sizes. This was necessary since small leaves have a larger surface to volume ratio than large leaves and thus will tend to infuse faster than large leaves anyway.

In each case 200 ml boiling deionised water was added to a pre-warmed Thermos flask containing 2 g (±0.05 g) leaf tea. The flask was stoppered and briefly inverted, then the leaf was allowed to infuse for 3 minutes. The flask was then inverted again, and the liquor filtered through WHATMAN 541™ filter paper, using a Buchner funnel and flask under vacuum.

The colour of the infusions was measured on a HUNTERLAB ULTRASCAN Xe™ colorimeter using a standard analytical method (provided by the manufacturer). The results quoted in Table 10 below are for a 1 cm path length, with D65 illuminant and an observer angle of 10°.

Colour is measured and represented by three colour dimensions, $L^*$, $a^*$ and $b^*$. $L^*$ represents paleness/darkness, with L=0 being black and L=100 being white or colourless. $a^*$ represents redness/greeness, with high positive values of $a^*$ being red and high negative values of $a^*$ being green. $B^*$ represents blueness/yellowness, with high positive values of $b^*$ being yellow and high negative values of $b^*$ being blue.

TABLE 10

Infusion performance of leaf teas of comparable size

| SAMPLE | L* | a* | b* |
|---|---|---|---|
| ODX01 | 83.1 | 8.5 | 69.7 |
| ODX02 | 81.9 | 8.3 | 61.2 |
| ODX05 | 82.2 | 11.2 | 79.9 |
| ODX06 | 82.5 | 9.3 | 74.2 |
| ODX07 | 79.1 | 11.9 | 72.5 |
| CTC01 | 80.8 | 12.8 | 82.8 |
| CTC02 | 79.7 | 13.5 | 80.7 |
| CTC03 | 77.9 | 19.1 | 91.9 |
| CTC04 | 80.4 | 12.5 | 80.4 |
| CTC07 | 77.3 | 12.0 | 75.3 |
| CTC08 | 75.4 | 14.7 | 80.4 |
| CTC09 | 74.3 | 17.5 | 85.3 |
| CTC10 | 74.3 | 18.7 | 91.2 |
| 143 ML | 80.45 | 14.12 | 82.92 |
| 147 ML | 78.55 | 16.9 | 86.95 |
| 269 ML | 79.47 | 16.28 | 91.50 |
| 270 ML | 80.72 | 14.56 | 89.09 |

Figure 5:
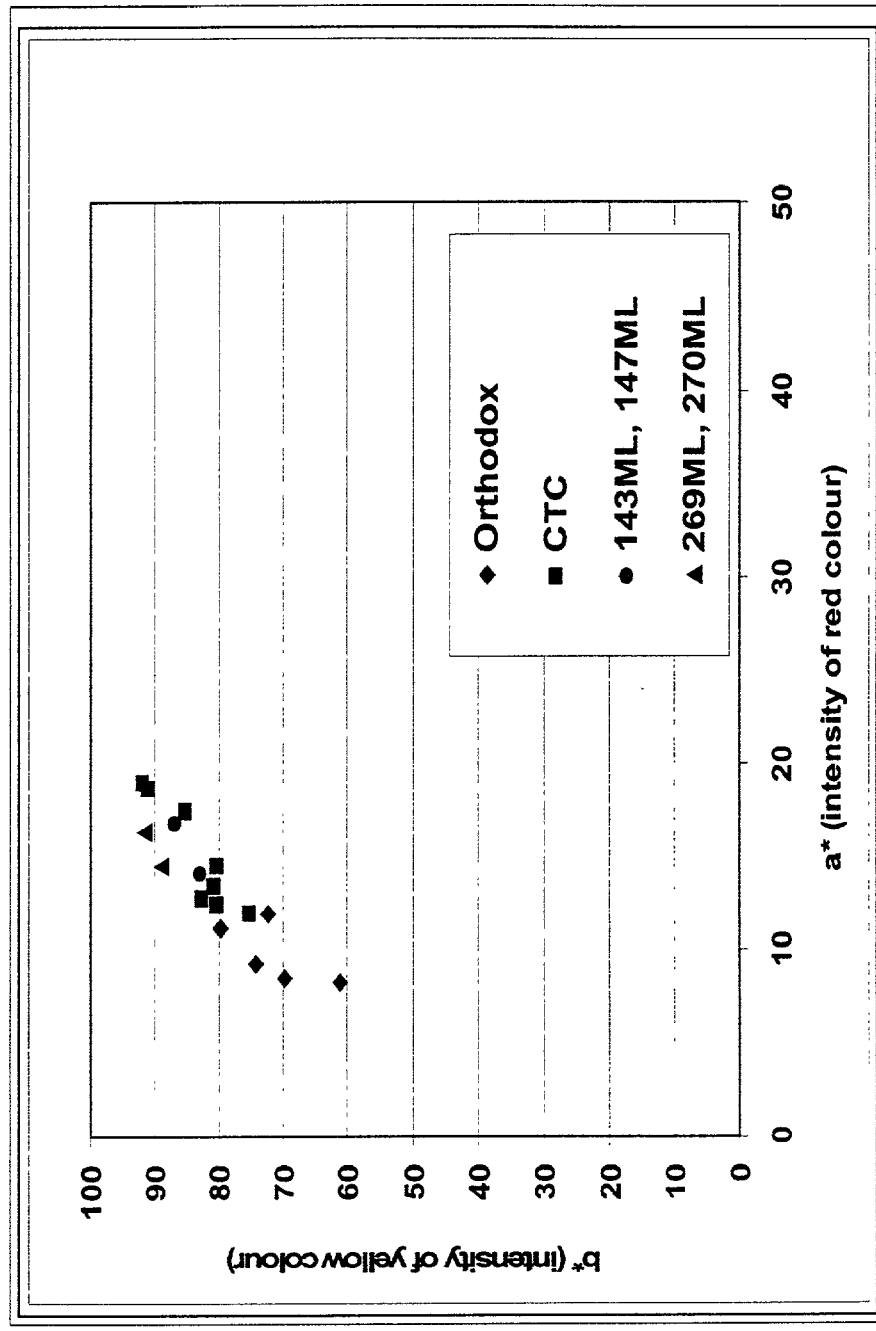
FIG. 5 is a graph from which one can compare the infusion performance of certain orthodox and CTC teas with that of teas made according to the process described in our co-pending international patent application WO 01/82713 (claiming priority from United Kingdom patent application GB 0010315.0) and the process of the present invention. See Example 5.

The $a^*$ and $b^*$ values were plotted to give FIG. 5. Each point on the graph plots the position of the liquor colour in colour space.

Points nearer the top right hand corner of the graph represent liquors with stronger yellow or red components respectively.

One can see from FIG. 5 that the leaf teas of the present invention (269 ML and 270 ML) fall within the cluster of results for CTC teas rather than the cluster of results of the orthodox teas. This clearly demonstrates that the black leaf teas of the present invention infuse like CTC manufactured teas rather than orthodox manufactured teas.

EXAMPLE 6

Differentiating Between Orthodox and CTC Teas by Infusion Performance in the Absence of Milk The inventors infused each of the 17 teas from around the world used in Example 2 and compared the infusion performance of those teas against several samples of large leaf (LL) and medium leaf (ML)teas made by the process described in our co-pending international patent application WO 01/82713 (claiming priority from United Kingdom patent application GB 0010315.0) (the samples are designated 143,146,147,149,152 LL and 143,146,147,149,152 ML in Table 12) and samples of large leaf (LL) and medium leaf (ML)teas made according to the process of Example 1(the samples are designated 280,281 LL and 280,281 ML in Table 12).

In each case, to imitate the preparation of tea in Continental Europe, 2.0 g (±0.05 g) tea was infused in 250 ml of freshly boiled tap water (Crawley, United Kingdom) for 1.5 minutes and an expert tea taster assessed the liquor quality with respect to taste (T), colour (C), brightness (B) and mouthfeel (M). The TCBM nomenclature used to report the results of the assessment in this Example and in Example 7 has replaced earlier QCBT nomenclature in which the property now reported as T (taste) was reported as Q (quality) and the property now reported as M (mouthfeel) was reported as T (thickness). It is only the nomenclature that has been changed as the assessment methodology is as before.

Liquor quality was measured on a scale of from 0.6 to 9.4 as given in Table 11 below.

TABLE 11

| Liquor quality assessment | | |
|---|---|---|
| T—Taste | 0.6 (plain) | 9.4 (flavoury) |
| C—Colour | 0.6 (yellow) | 9.4 (red) |
| B—Brightness | 0.6 (dull) | 9.4 (bright) |
| M—Mouthfeel | 0.6 (thin) | 9.4 (thick) |

The results are given in Table 12 below.

TABLE 12

Liquor quality assessment of non-milked infusions

| SAMPLE | T | C | B | M |
|---|---|---|---|---|
| ODX1 | 4.0 | 3.0 | 4.2 | 3.0 |
| ODX2 | 2.6 | 2.6 | 2.8 | 2.6 |
| ODX3 | 4.4 | 2.2 | 4.0 | 4.0 |
| ODX4 | 4.0 | 4.4 | 4.4 | 4.6 |
| ODX5 | 5.2 | 2.2 | 5.4 | 3.0 |
| ODX6 | 4.6 | 2.0 | 5.6 | 2.6 |
| ODX7 | 4.4 | 3.0 | 5.2 | 4.0 |
| CTC1 | 5.0 | 4.0 | 6.0 | 3.6 |
| CTC2 | 3.0 | 4.2 | 5.0 | 3.4 |
| CTC3 | 4.0 | 4.2 | 5.0 | 2.2 |
| CTC4 | 3.4 | 4.6 | 5.0 | 3.0 |
| CTC5 | 2.8 | 4.4 | 4.6 | 3.6 |
| CTC6 | 2.6 | 3.2 | 4.0 | 3.0 |
| CTC7 | 5.6 | 2.0 | 6.0 | 2.8 |
| CTC8 | 4.6 | 4.6 | 5.8 | 4.6 |
| CTC9 | 3.6 | 4.4 | 5.6 | 4.0 |
| CTC10 | 4.8 | 4.0 | 5.8 | 5.0 |
| 143 LL | 5.0 | 3.8 | 5.2 | 4.0 |
| 146 LL | 4.6 | 4.2 | 5.2 | 4.2 |
| 147 LL | 5.2 | 4.0 | 5.4 | 4.0 |
| 149 LL | 5.0 | 4.2 | 5.2 | 4.2 |
| 152 LL | 5.4 | 3.6 | 5.4 | 4.0 |
| 143 ML | 4.8 | 4.4 | 5.2 | 4.4 |
| 146 ML | 4.4 | 4.8 | 5.4 | 4.6 |

TABLE 12-continued

Liquor quality assessment of non-milked infusions

| SAMPLE | T | C | B | M |
|---|---|---|---|---|
| 147 ML | 4.6 | 4.4 | 5.4 | 4.4 |
| 149 ML | 4.8 | 4.4 | 5.4 | 4.4 |
| 152 ML | 5.0 | 4.0 | 5.4 | 4.0 |
| 280 LL | 5.0 | 4.0 | 5.0 | 4.2 |
| 281 LL | 5.2 | 4.0 | 5.0 | 4.0 |
| 280 ML | 5.0 | 4.4 | 5.0 | 4.4 |
| 281 ML | 5.2 | 4.4 | 5.0 | 4.6 |

Figure 6:
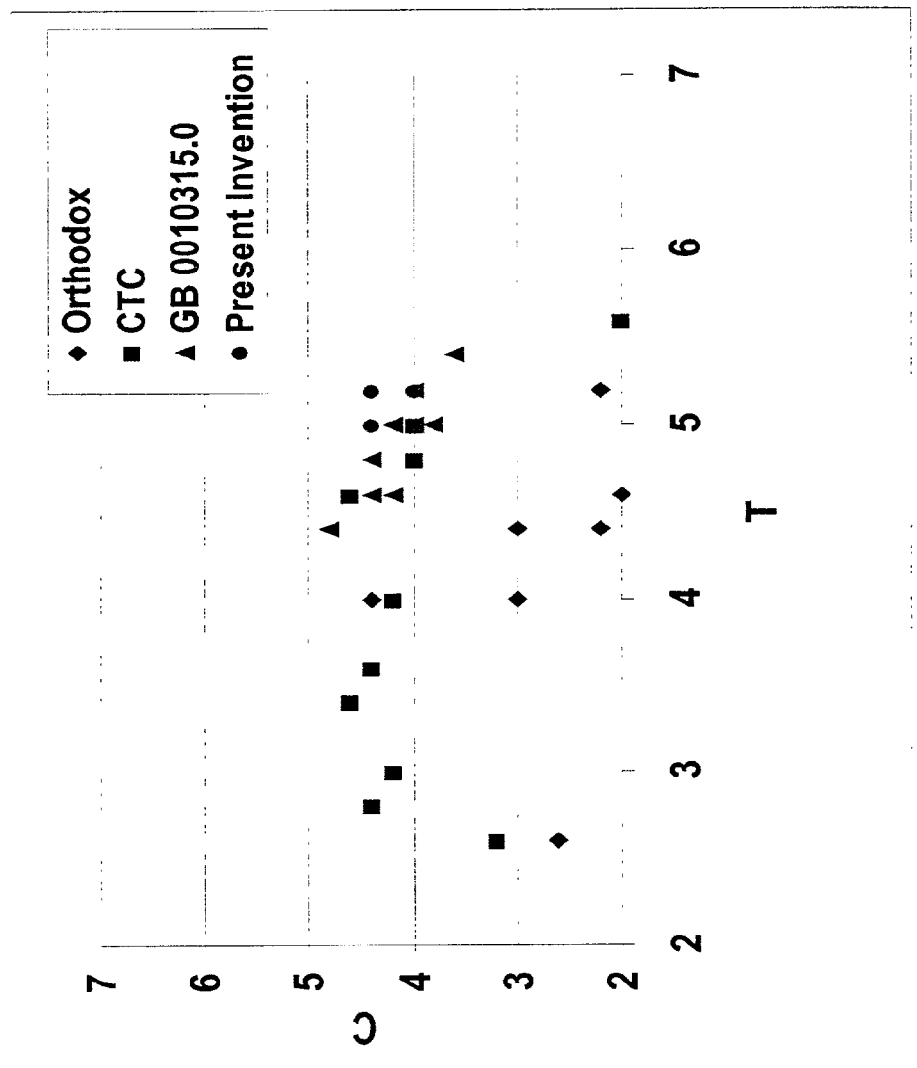
FIG. 6 is a graph from which one can compare the quality and colour of milk-free infusions prepared from certain orthodox and CTC teas with that of teas made according to the process described in our co-pending international patent application WO 01/82713 (claiming priority from United Kingdom patent application GB 0010315.0) and the process of the present invention. See Example 6.

The T (taste) and C (colour) values were plotted to give FIG. 6. One can see from that FIG. 6 that the known CTC manufactured teas tended to provide more colourful infusions than the known orthodox manufactured teas. It is also clear from FIG. 6 that black teas of the present invention infused in a manner akin to more colourful CTC manufactured teas rather than orthodox manufactured teas.

EXAMPLE 7

Differentiating Between the Infusion Performance of Orthodox and CTC Teas in the Presence of Milk The inventors infused each of the 17 teas from around the world used in Example 2 and compared the infusion performance of those teas against several samples of teas made by the process described in our co-pending international patent application WO 01/82713 (claiming priority from United Kingdom patent application GB 0010315.0) (the samples are designated 143,146,147,149,152 LL and 143, 146,147,149,152 ML in Table 13) and samples of large leaf (LL) and medium leaf (ML) teas made according to the process of Example 1 (the samples are designated 280,281 LL and 280,281 ML in Table 13).

In each case, to imitate the preparation of tea in the United Kingdom, 3.125 g (±0.05 g) tea was infused in 235 ml of freshly boiled tap water (Crawley, UK) for two minutes 15 seconds (static brew). The liquor was then tipped onto 10 ml of semi-skimmed milk and an expert tea taster assessed the liquor quality with respect to taste (T), colour (C), brightness (B) and mouthfeel (M). Liquor quality was measured on a scale of from 0.6 to 9.4 as given in Table 11 above. The results are given in Table 13 below.

TABLE 13

Liquor quality assessment of milked infusions

| SAMPLE | T | C | B | M |
|---|---|---|---|---|
| ODX1 | 4.2 | 3.2 | 4.4 | 3.6 |
| ODX2 | 2.4 | 2.0 | 2.0 | 2.6 |
| ODX3 | 4.2 | 2.6 | 4.6 | 3.8 |
| ODX4 | 3.8 | 2.8 | 4.0 | 4.6 |
| ODX5 | 5.6 | 3.6 | 5.8 | 3.2 |
| ODX6 | 4.4 | 3.2 | 5.4 | 3.0 |
| ODX7 | 4.0 | 2.8 | 4.6 | 4.0 |
| CTC1 | 4.6 | 4.0 | 6.0 | 3.6 |
| CTC2 | 2.8 | 4.2 | 4.4 | 3.0 |
| CTC3 | 3.8 | 6.6 | 4.2 | 2.2 |
| CTC4 | 3.2 | 5.0 | 4.0 | 2.8 |
| CTC5 | 2.8 | 4.2 | 4.4 | 3.8 |
| CTC6 | 3.0 | 5.8 | 4.0 | 3.0 |
| CTC7 | 5.6 | 4.0 | 6.4 | 3.0 |
| CTC8 | 3.6 | 7.2 | 3.6 | 4.2 |
| CTC9 | 4.0 | 4.0 | 5.0 | 4.0 |
| CTC10 | 4.6 | 4.0 | 6.0 | 4.6 |
| 143 LL | 4.6 | 5.6 | 4.0 | 4.0 |

TABLE 13-continued

Liquor quality assessment of milked infusions

| SAMPLE | T | C | B | M |
|---|---|---|---|---|
| 146 LL | 4.2 | 5.6 | 4.2 | 4.0 |
| 147 LL | 5.0 | 5.2 | 4.8 | 4.2 |
| 149 LL | 4.6 | 5.4 | 4.4 | 4.0 |
| 152 LL | 5.2 | 5.0 | 5.0 | 4.2 |
| 143 ML | 4.4 | 5.8 | 4.0 | 4.4 |
| 146 ML | 4.2 | 6.0 | 4.0 | 4.4 |
| 147 ML | 4.6 | 5.6 | 4.4 | 4.4 |
| 149 ML | 4.4 | 5.8 | 4.2 | 4.6 |
| 152 ML | 5.0 | 5.0 | 5.0 | 4.2 |
| 280 LL | 4.8 | 4.4 | 5.0 | 4.4 |
| 281 LL | 5.2 | 4.6 | 5.0 | 4.4 |
| 280 ML | 5 | 4.8 | 5.2 | 4.6 |
| 281 ML | 5.2 | 4.8 | 5.2 | 4.8 |

Figure 7:
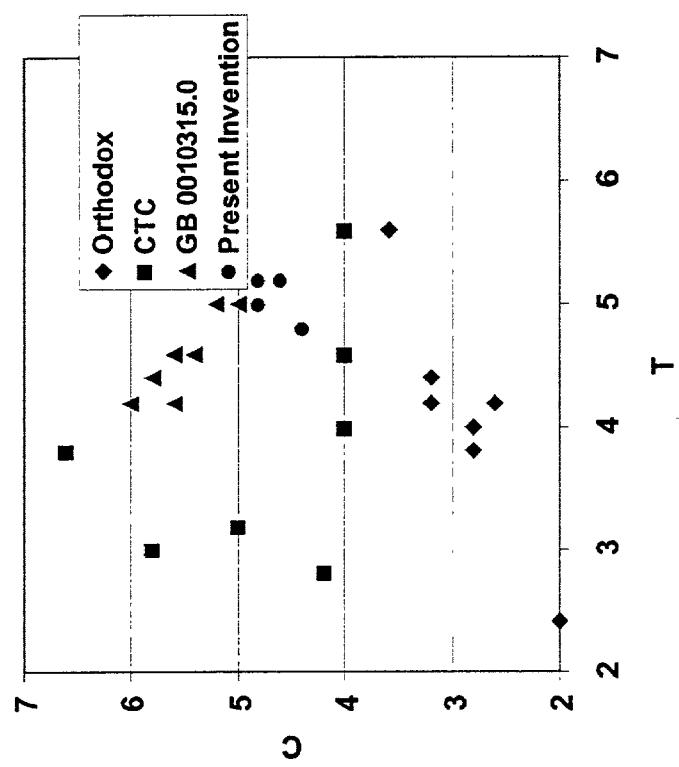
FIG. 7 is a graph from which one can compare the quality and colour of milked infusions prepared from certain orthodox and CTC teas with that of teas made according to the process described in our co-pending international patent application WO 01/82713 (claiming priority from United Kingdom patent application GB 0010315.0) and the process of the present invention. See Example 7.

The T (taste) and C (colour) values were plotted to give FIG. 7. One can see from that FIG. 7 that all of the known CTC manufactured teas provided more colourful milked infusions than all of the known orthodox manufactured teas. It is also clear from FIG. 7 that black teas of the present invention provided milked infusions amongst the best of the known CTC manufactured teas.

EXAMPLE 8

Figure 8:
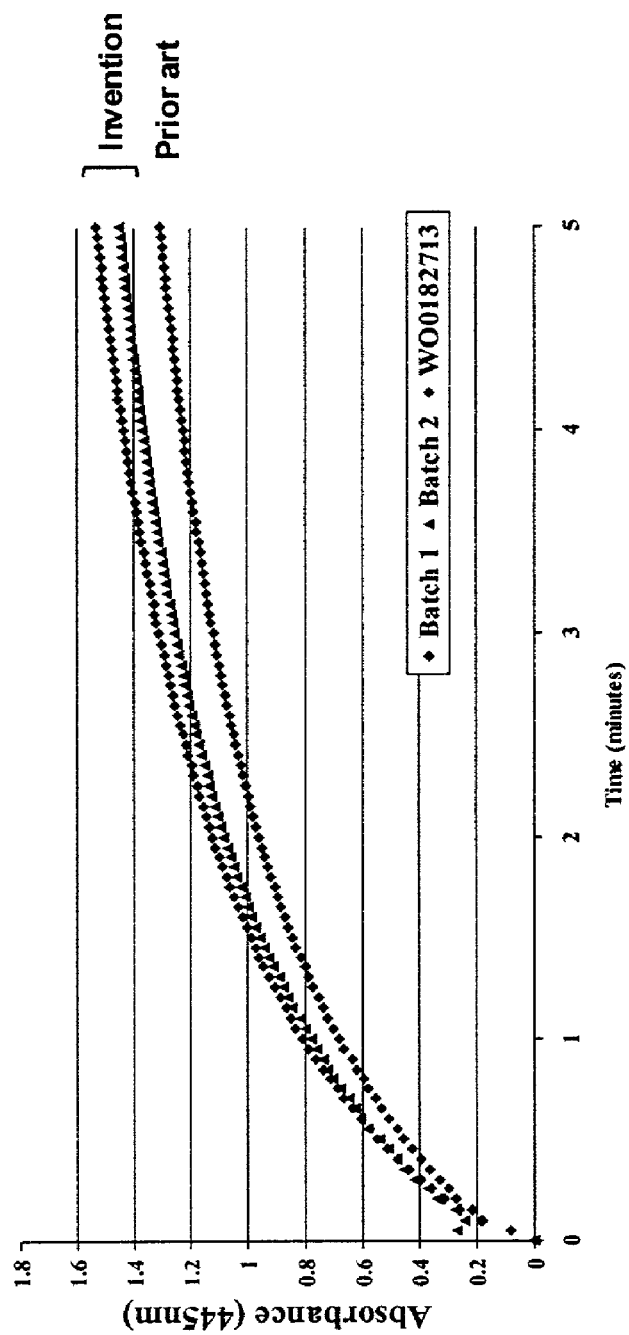
FIG. 8 is a graph comparing the infusion performance of large leaf black teas made according to the process described in co-pending international patent application WO 01/82713 (claiming priority from United Kingdom patent application GB 0010315.0) and the process of the present invention. See Example 8.
Figure 9:
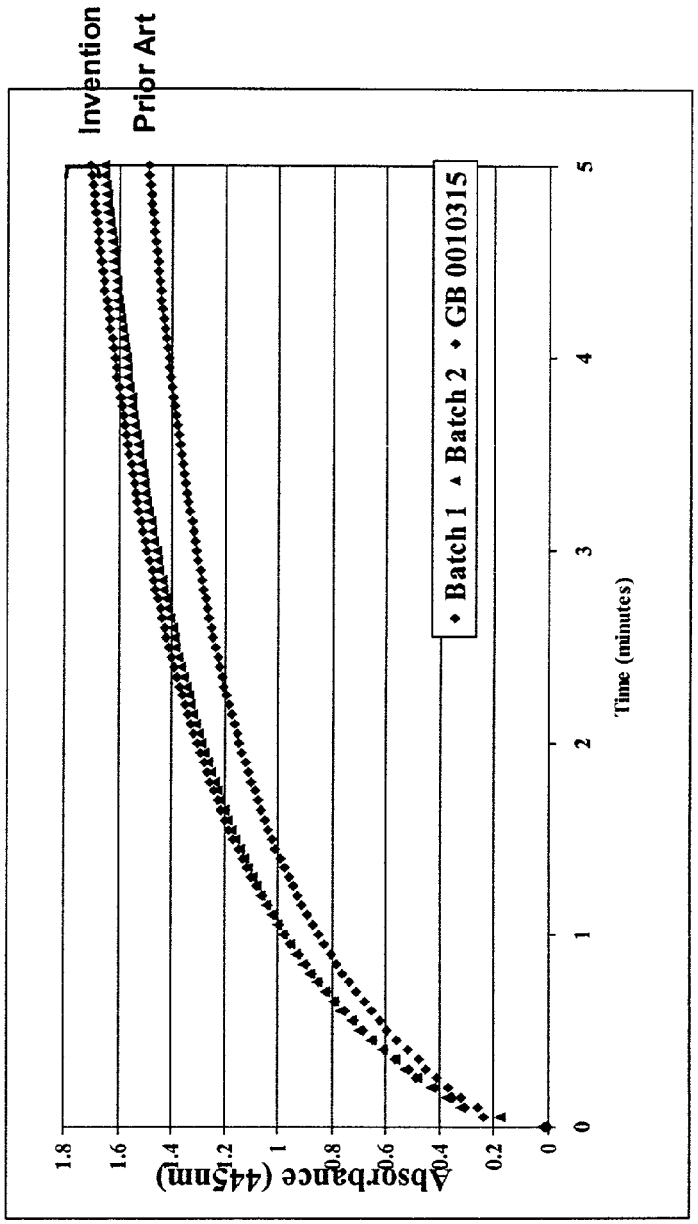
FIG. 9 is a graph comparing the infusion performance of medium leaf black teas made according to the process described in our co-pending international patent application WO 01/82713 (claiming priority from United Kingdom patent application GB 0010315.0) and the process of the present invention. See Example 8.

Comparing Infusion Performance of Black Leaf Teas Made by the Process of WO 01/82713 and the Process of the Present Invention 2 g of large leafed and medium leafed black teas made by the process of co-pending international patent application WO 01/82713 (claiming priority from United Kingdom patent application GB 0010315.0) and 2 g samples of two batches of black leaf teas made by the process of Example 1 from the same tea leaves were infused in 200 ml boiling water and the rate of infusion was tracked by measuring absorbance at 445 nm. The measurements for the large leaf teas are plotted in FIG. 8 and the measurements for the medium leaf teas are plotted in FIG. 9.

It is clear from both Figures that black teas made by the process of the present invention infused significantly faster and more completely than the tea made by the process of our co-pending international patent application WO 01/82713.

EXAMPLE 9

The following black teas were prepared in a Brooke Bond tea factory in Kenya from the same plucked tea leaves, (a) standard CTC tea (b) tea produced with a standard rotorvane, (c) tea produced by the process of the present invention using a modified rotorvane and (d) teas produced by the process of the present invention using a modified rotorvane followed by 6 tpi CTC. The teas produced were assessed by an expert tea taster in a similar way to that described earlier in Example 6 and the scores are given in Table 14.

TABLE 14

| SAMPLE | T | C | B | M |
|---|---|---|---|---|
| CTC | 4.8 | 3.4 | 5.6 | 3.8 |
| Standard rotorvane | 5.6 | 3.0 | 5.8 | 3.8 |
| Modified rotorvane | 5.0 | 3.5 | 5.4 | 3.7 |
| Modified rotorvane and 6 tpi CTC | 5.1 | 3.7 | 5.4 | 4.0 |

It can be seen that the use of the modified rotorvane to apply the necessary shear and compression in the process of the present invention results in higher colour scores. In addition to altering the grade profile the use of the 6 tpi CTC after the modified rotorvane step leads to even higher colour scores.

EXAMPLE 10

Factory-scale experiments were performed to characterise the impact of the modified rotorvane and the 6 tpi CTC step on yield of various grades of leaf tea obtained by using the process of the present invention. Four experiments were performed:—(a) using a standard rotorvane (RV), (b) using a modified rotorvane with some reversed vanes (MRV), (c) using a standard rotorvane (RV) followed by a 6 tpi CTC cut, (d) using a modified rotorvane with some reversed vanes (MRV) followed by a 6 tpi CTC cut, as the maceration step. All other process parameters were kept constant as in Example 1. The resulting dried leaf teas were sorted using Boulton meshes 8, 12, 20, 32 and 40. The aperture sizes of the sortation meshes are given in Table 1.

Oversize particles which were retained on the 8 mesh screen and small particles which passed through the 40 mesh screen are considered as waste materials. It is obviously important that the amount of such waste materials is kept as low as possible. Table 15 shows that the amount of such waste particles can be reduced by using the modified rotorvane according to the process of the present invention. The use of the modified rotorvane also increases the amount of large leaf (LL) grade produced compared to the use of the unmodified rotorvane.

TABLE 15

|  | LL % | ML % | SL % | FL % | D % | Waste % |
| --- | --- | --- | --- | --- | --- | --- |
| RV only | 21 | 32 | 14 | 1 | 1 | 31 |
| MRV only | 27 | 35 | 15 | 1 | 0 | 21 |

Table 16 shows that the CTC cut further reduces the amount of waste particles in the product and that the use of the modified rotorvane prior to the 6 tpi cut results in less waste material than is seen when the unmodified rotorvane is used. It also shows that the CTC cut after the rotorvane step increases the amount of medium (ML) and small leaf (SL) sizes making the resulting black tea suitable for use in tea bags.

TABLE 16

|  | LL % | ML % | SL % | FL % | D % | Waste % |
| --- | --- | --- | --- | --- | --- | --- |
| RV/CTC | 11 | 39 | 33 | 3 | 2 | 12 |
| MRV/CTC | 13 | 38 | 36 | 3 | 2 | 8 |

EXAMPLE 11

Samples of three batches of small leaf (SI) and fine leaf (FL) black teas made by the process of Example 1 were evaluated in a similar manner to that described in Example 6. The samples are identified as SL-1, SL-2, SL-3, FL-1, FL-2 and FL-3 in Table 17. The taste (T) evaluation was performed on CTC processed black leaf tea that had been manufactured by conventional CTC processing from the same green leaf at the same time as the samples processed according to the present invention. The CTC teas were sorted using screens of Boulton Mesh 15, 25 and 40. The black leaf tea collected between the 15 and 25 screens is labelled PF1 in Table 17 and the black leaf tea collected between screens 25 and 40 is labelled PD. Samples of three different batches were evaluated. These batches are identified as PF1-1, PF1-2, PF1-3, PD-1, PD-2 and PD-3 in Table 17.

TABLE 17

| Example 1 | T | CTC processed | T |
| --- | --- | --- | --- |
| SL-1 | 5.2 | PF1-1 | 3.8 |
| SL-2 | 5.2 | PF1-2 | 3.8 |
| SL-3 | 5.2 | PF1-3 | 4.0 |
| FL-1 | 4.8 | PD-1 | 3.8 |
| FL-2 | 5.2 | PD-2 | 3.8 |
| FL-3 | 5.2 | PD-3 | 3.8 |

From Table 17 it can be seen that the black leaf teas prepared by the process of the present invention achieved higher taste scores than were seen with conventionally processed CTC leaf tea of similar size.

EXAMPLE 12

In order to optimise the current process, and to understand it better, a programme of work was carried out at a pilot-scale in the UK (Colworth Research Laboratory). This work compared a process according to the present invention in which the tea leaves were macerated by high pressure rolling followed by a low pressure cut with a conventional CTC process and a process in which the tea leaves were macerated by a low pressure cut only (this does not form part of the present invention). The impact of a high pressure treatment of tea leaf during maceration was demonstrated during such pilot-scale processing experiments.

Figure 10:
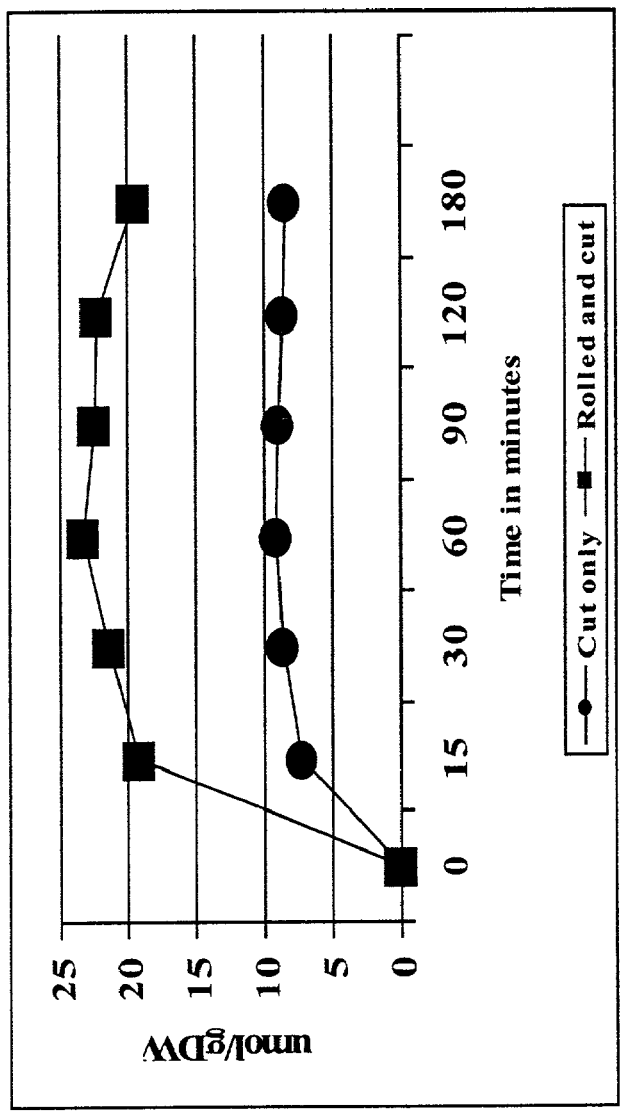
FIG. 10 is a graph showing the theaflavin levels obtained during the fermentation of tea leaves in the process of the present invention. See Example 11
Figure 11:
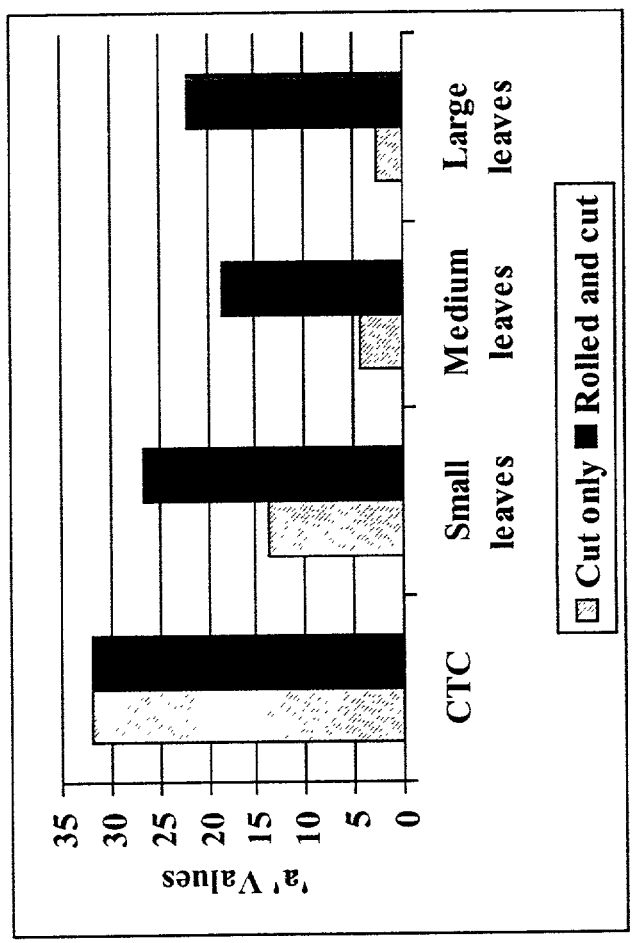
FIG. 11 is a graph showing the colour of infusions made from leaf tea prepared by the process of the present invention and from tea leaves made by other processes See Example 11

Green leaf (Kenyan Clone 35) obtained as a chilled shipment from Brooke Bond Kenya plantations was withered to a moisture content of 68+/−1%, and was either macerated with a low pressure cut using a Alexanderwerk AWBS 150 Vegetable Slicer or subjected to a high pressure roll with a Twin Roll Mill (RSG Colworth), operating at speed ratio of 4:1, gap width 150 μm followed by the low pressure cut. After maceration the dhool was fermented for 120 minutes at 25° C. and subsequently dried in a lab-scale fluid-bed drier. Analysis of theaflavin levels (FIG. 10) during fermentation clearly show the enhanced fermentation in material subjected to the rolling step. This is also reflected in the colour measurements taken from the liquors of made tea samples (FIG. 11). Small, medium and large grades were analysed and in all cases the rolled samples gave more coloury liquors. The effect was however more pronounced as the particle size increased. Microscopic examination of the macerated leaf reveal that the rolling step introduces a significant number of air spaces into the tissue (FIG. 12), which are retained in the made tea. These air spaces allow faster hydration and infusion of the tea particles during the brewing process.

EXAMPLE 13

Figure 13:
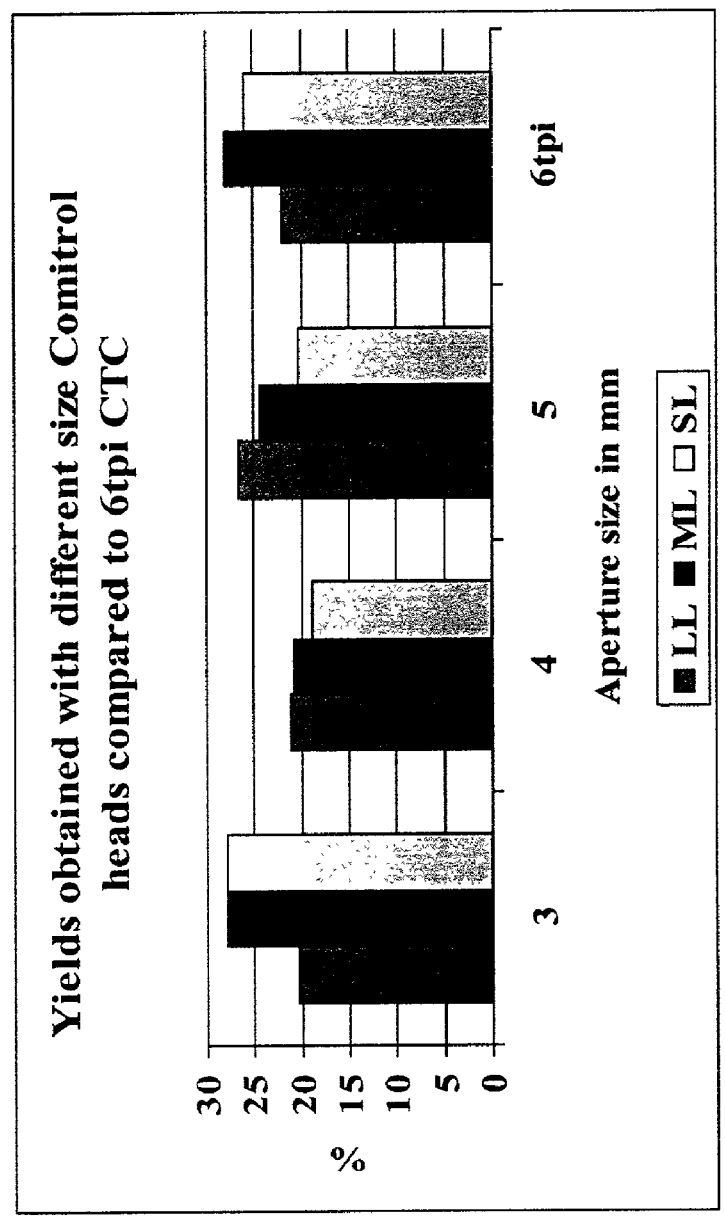
FIG. 13 is a graph showing the yields obtained by making modifications to the process of the present invention. See Example 12
Figure 14:
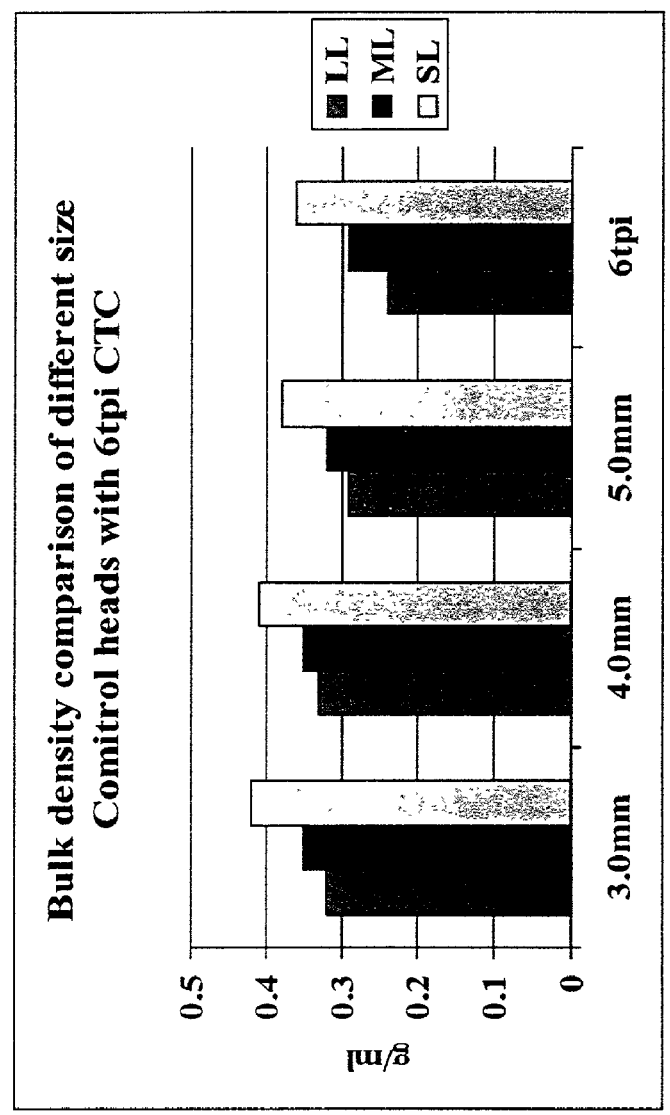
FIG. 14 is a graph showing the bulk densities of the teas obtained by making modifications to the process of the present invention. See Example 12
Figure 15:
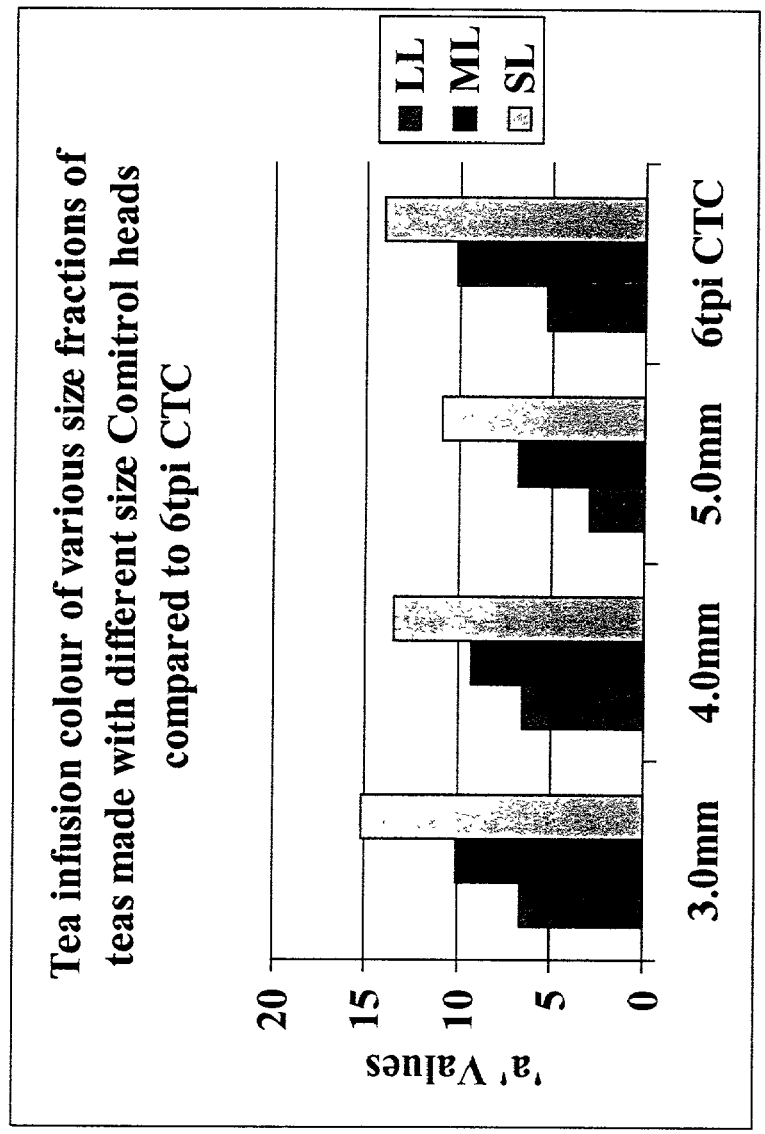
FIG. 15 is a graph showing the colour of infusions of leaf tea obtained by making modifications to the process of the present invention. See Example 12

A comparison was made between using a 6 tpi CTC to modify the leaf post-rotorvane as described in the process of Example 1 and using an Urshel Comitrol (model 3600). This was performed at pilot-plant scale in a Brooke Bond tea factory in Kenya. Green leaf was withered in troughs to a moisture content of 68–70% and fed into an 8" rotorvane at 200 Kg/hr. Dhool from the rotorvane was passed through either the CTC or the Comitrol with one of three different heads (with varying aperture size, 3.0 mm, 4.0 mm or 5.00 mm). Post-maceration dhool was fermented on two Continuous Fermenting Units (CFU 1, 60 minutes, temperature 20–22° C.; CFU 2, 80 minutes, temperature 24–26° C.) and subsequently dried in a fluid-bed drier and sorted to give large (LL), medium (ML) and small (SL) grades. These grades produced using the Comitrol machine were compared with tea produced using the 6 tpi CTC machine as described in Example 1. FIG. 13 shows the yields obtained using the above procedures. FIG. 14 shows the bulk densities of the dried black teas produced by the above procedures. FIG. 15 indicates the colour of the infusions as represented by the "a*" value (ie the "redness" of the infusion measured as described in Example 5) for infusions made from the teas produced by the above methods. The Comitrol can be used in place of the 6 tpi, with the advantage of higher bulk density (advantages for packing, particularly in to tea-bags) and the ability to manipulate grade profile through the selection of different heads.

The invention claimed is:

1. A process for manufacturing larger leaf black tea comprising the steps of withering and macerating tea leaves modified to deliver increased shear and compression, allowing them to ferment, firing the leaves to arrest fermentation and then drying and sorting them to yield black leaf tea, the process being characterised in that the tea leaves are withered to a moisture content of between 64% and 70% before being macerated by the controlled application of both shear and compression forces sufficient to disrupt the majority of cells within the tea leaf, to introduce morphological changes in the tissue and to redistribute the cell contents, all of which leads to fermentation and infusion typical of CTC teas, whilst maintaining the appearance of orthodox tea, wherein said controlled application is achieved using a modified rotovane machine with at least some vanes replaced by reverse facing vanes or by using other equipment providing the same controlled application effects.

2. A process according to claim 1 wherein the tea leaves are withered to a moisture content of between 64 and 68%.

3. A process according to claim 1 wherein the dried black leaf tea is sorted to select black leaf tea of Broken Orange Pekoe grade or larger.

4. A process according to claim 1 wherein the withered leaves are macerated by being passed through a rotorvane machine in which at least some of the vanes have been replaced by reverse facing vanes.

5. A process according to claim 3 wherein the dried black leaf tea is sorted to select black leaf tea of Broken Orange Pekoe grade or larger.

6. A process according to claim 1 wherein the tea leaves leaving the rotorvane are further cut, diced or chopped.

7. A process according to claim 6 wherein the tea leaves leaving the rotovane are further cut by being passed through a CTC machine.

8. A process according to claim 7 wherein the blade of the CTC machine has 2 to 6 teeth per inch.

9. A process according to claim 6 wherein the dried black leaf tea is sorted to select black leaf tea of Broken Orange Pekoe grade and/or Broken Orange Pekoe Fannings grade.

10. A process according to claim 7 wherein the dried black leaf tea is sorted to select black leaf tea of Broken Orange Pekoe grade and/or Broken Orange Pekoe Fannings grade.

11. A process according to claim 8 wherein the dried black leaf tea is sorted to select black leaf tea of Broken Orange Pekoe grade and/or Broken Orange Pekoe Fannings grade.

12. A process according to claim 6 wherein the tea leaves leaving the rotovane are further diced or chopped by being passed through a two dimensional belt-fed dicer with circular knives or a food processor with rotary micro-cut heads.

13. A process according to claim 1 wherein the withered leaves are macerated by being passed through an extruder machine.

* * * * *